US012790360B2

(12) United States Patent
Diao et al.

(10) Patent No.: US 12,790,360 B2
(45) Date of Patent: Nov. 10, 2026

(54) DEPOLYMERIZATION AND VALORIZATION OF A BIOPOLYMER

(71) Applicant: NEW YORK UNIVERSITY, New York, NY (US)

(72) Inventors: Tianning Diao, New York, NY (US); Mason Chin, Brooklyn, NY (US); Sang Mi Suh, Los Angeles, CA (US)

( * ) Notice: Subject to any disclaimer, the term of this patent is extended or adjusted under 35 U.S.C. 154(b) by 1073 days.

(21) Appl. No.: 17/705,762

(22) Filed: Mar. 28, 2022

(65) Prior Publication Data

US 2022/0324895 A1 Oct. 13, 2022

Related U.S. Application Data

(60) Provisional application No. 63/168,391, filed on Mar. 31, 2021.

(51) Int. Cl.
*C07G 1/00* (2011.01)
*B01J 35/39* (2024.01)
*C08H 7/00* (2011.01)

(52) U.S. Cl.
CPC ................ *C07G 1/00* (2013.01); *B01J 35/39* (2024.01); *C08H 6/00* (2013.01)

(58) Field of Classification Search
CPC ............... C07G 1/00; B01J 35/39; C08H 6/00
See application file for complete search history.

(56) References Cited

U.S. PATENT DOCUMENTS

2019/0127304 A1* 5/2019 Luterbacher ........ C08B 37/0057

FOREIGN PATENT DOCUMENTS

WO WO-2017090714 A1 * 6/2017 ............. B01J 37/04

OTHER PUBLICATIONS

Rahimi, Alireza, et al. "Formic-acid-induced depolymerization of oxidized lignin to aromatics." Nature 515.7526 (2014): 249-252. (Year: 2014).*

Du, Xu, et al. "Electrochemical lignin conversion." ChemSusChem 13.17 (2020): 4318-4343. (Year: 2020).*

Luo, Nengchao, et al. "Photocatalytic oxidation-hydrogenolysis of lignin β-O-4 models via a dual light wavelength switching strategy ." ACS catalysis 6.11 (2016): 7716-7721. (Year: 2016).*

Matt, Christof, Frederic Kölblin, and Jan Streuff. "Reductive C-O, C-N, and C-S cleavage by a zirconium catalyzed hydrometalation/β-elimination approach." Organic Letters 21.17 (2019): 6983-6988. (Year: 2019).*

Nguyen, John D., Bryan S. Matsuura, and Corey RJ Stephenson. "A photochemical strategy for lignin degradation at room temperature." Journal of the American Chemical Society 136.4 (2014): 1218-1221. (Year: 2014).*

Mobley, Justin K., et al. "Oxidation of lignin and lignin β-O-4 model compounds via activated dimethyl sulfoxide." RSC Advances 5.127 (2015): 105136-105148. (Year: 2015).*

Wu, Wen-Bin, and Jing-Mei Huang. "Electrochemical cleavage of aryl ethers promoted by sodium borohydride." The Journal of Organic Chemistry 79.21 (2014): 10189-10195. (Year: 2014).*

Zhu, Haibin, et al. "Electrochemical depolymerization of lignin into renewable aromatic compounds in a non-diaphragm electrolytic cell." RSC advances 4.56 (2014): 29917-29924. (Year: 2014).*

Guadix-Montero, Susana, and Meenakshisundaram Sankar. "Review on catalytic cleavage of CâC inter-unit linkages in lignin model compounds: towards lignin depolymerisation." Topics in Catalysis 61 (2018): 183-198. (Year: 2018).*

Fartel, Beata. Titanocene and zirconocene complexes for the carbon-oxygen bond cleavage of lignin model compounds. Diss. University of British Columbia, 2014. (Year: 2014).*

Fijalkowski, Karol J. "Enhanced Activity of Titanocene Complex for Electrocatalytic Nitrogen Reduction Reaction." Catalysts 11.3 (Mar. 18, 2021): 389. (Year: 2021).*

Rahimi, Alireza, et al. "Formic-acid-induced depolymerization of oxidized lignin to aromatics." Nature 515.7526 (2014): Supplementary Information (Year: 2014).*

Gansauer, Andreas, and Tobias Dahmen. "Reductive cleavage of 2, 2, 2-trichloroethyl esters by titanocene catalysis." Chimia 66.6 (2012): 433-433. (Year: 2012).*

English translation of WO2017090714A1. Obtained from Espacenet on Feb. 24, 2026 (Year: 2026).*

Chen, Aolin, et al. "Electrochemical decomposition of wheat straw lignin into guaiacylâ, syringylâ, and phenolâtype compounds using Pb/PbO2 anode and alloyed steel cathode in alkaline solution." Environmental Progress & Sustainable Energy 38.4 (2019): 13117. (Year: 2019).*

Huang, Binbin, Lin Guo, and Wujiong Xia. "A facile and versatile electro-reductive system for hydrodefunctionalization under ambient conditions." Green Chemistry 23.5 (2021): 2095-2103. (Year: 2021).*

Pacut, Ryszard I., and Essie Kariv-Miller. "Birch-type reductions in aqueous media. Benzo [b] thiophene and diphenyl ether." The Journal of Organic Chemistry 51.18 (1986): 3468-3470. (Year: 1986).*

Bjørsvik, H.-R.; Minisci, F. Fine Chemicals from Lignosulfonates. 1. Synthesis of Vanillin by Oxidation of ignosulfonates. Org. Proc. Res. Dev. 1999, 3, 330-340.

Bosque, I. et al. Redox Catalysis Facilitates Lignin Depolymerization. ACS Cent. Sci. 2017, 3, 621.

(Continued)

*Primary Examiner* — Scarlett Y Goon
*Assistant Examiner* — David H Cho
(74) *Attorney, Agent, or Firm* — Riverside Law LLP

(57) ABSTRACT

A method of depolymerizing a biopolymer in a biomass is presented, the method comprising the step of contacting the biopolymer with a reaction system comprising at least one catalyst, at least one electron source, and at least one solvent. A second method of depolymerizing a biopolymer in a biomass is presented, the method comprising the step of contacting the biopolymer with an electrochemical cell comprising at least one catalyst, at least one solvent, at least one electrolyte, an anode, and a cathode. A third method of depolymerizing a biopolymer is presented, the method comprising the steps of providing a biopolymer; adding a photoredox-active functional group to the biopolymer to form a modified biopolymer; and irradiating the modified biopolymer with light in the presence of a reaction mixture; said mixture comprising a photoredox catalyst.

14 Claims, 20 Drawing Sheets

(56) References Cited

OTHER PUBLICATIONS

Brandi, F. et al. Controlled lignosulfonate depolymerization via solvothermal fragmentation coupled with catalytic hydrogenolysis/hydrogenation in a continuous flow reactor. Green Chem. 2021, 23, 9892.
Karkas, M. D. et al. Transition-metal catalyzed valorization of lignin: the key to a sustainable carbon-neutral future. Org. Biomol. Chem. 2016, 14, 1853.
Li, C. et al. Catalytic Transformation of Lignin for the Production of Chemicals and Fuels. Chem. Rev. 2015, 115, 1155.
Liu, S. et al. Selective depolymerization of lignosulfonate via hydrogen transfer enhanced in an emulsion microreactor. Bioresour. Technol. 2018, 264, 382.
Nguyen, S. T. et al. Light-Driven Depolymerization of Native Lignin Enabled by Proton-Coupled Electron Transfer. ACS Catal. 2020, 10, 800-805.
Parsell, T. et al. A synergistic biorefinery based on catalytic conversion of lignin prior to cellulose starting from lignocellulosic biomass. Green Chem. 2015, 17, 1492.
Questell-Santiago, Y. M. et al. Stabilization strategies in biomass depolymerization using chemical functionalization. Nat. Rev. Chem. 2020, 4, 311.
Rafiee, M. et al. Electrochemical Aminoxyl-Mediated Oxidation of Primary Alcohols in Lignin to Carboxylic Acids: Polymer Modification and Depolymerization J. Am. Chem. Soc. 2019, 141, 15266.
Shu, R. et al. Hydrogenolysis process for lignosulfonate depolymerization using synergistic catalysts of noble metal and metal chloride. RSC Adv. 2016, 6, 88788.
Song, Q. et al. Hydrogenolysis of lignosulfonate into phenols over heterogeneous nickel catalysts. Chem. Commun. 2012, 48, 7019.
Sun, Z. et al. Bright Side of Lignin Depolymerization: Toward New Platform Chemicals Chem. Rev. 2018, 118, 614.
Tuck, C. O. et al. Valorization of Biomass: Deriving More Value from Waste. Science 2012, 337, 695.
Xu, C. et al. Lignin depolymerisation strategies: towards valuable chemicals and fuels. Chem. Soc. Rev. 2014, 43, 7485.

* cited by examiner 1
2
3 sesamin 4

5

14

15

19
35 mg (isolated)
12 wt%

S/G = 2.5:1 eugenol
20
14 mg (isolated)
4.7 wt%

21 (181 mg)

2

13

12

2

13

1 2 3 3 4 5

Examples of photocatalysts

10

E(PC*/PC˙⁻) = 1.43 V (SCE)
E(PC/PC˙⁻) = -1.24 V (SCE)

11

E(PC*/PC˙⁻) = 2.06 V (SCE)
E(PC/PC˙⁻) = -0.57 V (SCE)

Bases

Inorganic: metal carbonates, phosphates, sulfates, nitrates, fluorides, acetates, pivalates, etc.

Organic: $PAr_3$, $NR_3$, etc.

Solvents

DME, $CH_3OCH_2CH_2OCH_2CH_2OCH_3$, *n*$Bu_2O$, *i*$Pr_2O$, 2-MeTHF, EtOAc, 1,3-dioxolane, HMPA, DMPU, etc.

$CO_2$ scavengers molecular sieves, MOF, COF, zeolites

DEPOLYMERIZATION AND VALORIZATION OF A BIOPOLYMER

CROSS-REFERENCE TO RELATED APPLICATIONS

The present application claims priority to U.S. Provisional Application No. 63/168,391, filed Mar. 31, 2021, which is incorporated by reference herein in its entirety.

BACKGROUND OF THE INVENTION

The vast majority of chemicals are derived from petroleum products via a series of oxidation reactions, increasing the oxidation states of carbons and installing functional groups. These oxidation reactions are typically highly exothermic, suggesting that energy is wasted in the form of heat. Moreover, selective oxidation to introduce heteroatom-containing functional groups to a specific position represents a major challenge in upgrading petroleum feedstock. Finally, the depletion of petroleum reserves and the increasing concern of green-house gas emission has prompted the search for renewable chemical feedstocks. Biomass represents an alternative chemical feedstock, which may be more sustainable compared to conventional petroleum-based feedstock.

Biomass is a renewable feedstock for fuels, chemicals, and energy. A main constituent of lignocellulosic biomass (15-30% by weight, 40% by energy) is lignin, an amorphous polymer rich in aromatic motifs and C—O ether bonds (Zakzeski, et al., Chem. Rev. 2010, 110, 3552-3599; Azadi, et al. Renewable and Sustainable Energy Reviews 2013, 21, 506-523; Bruijnincx and Weckhuysen, Nature Chemistry 2014, 6, 1035-1036). As a by-product from the pulp and paper industry, the vast majority of lignin is burned as a low value fuel (Lora and Glasser, J. Polym. Environ. 2002, 10, 39-48). The highly functionalized structure of lignin suggests that it can potentially be transformed into valuable chemical feedstock with pre-installed functional groups. The only notable commercial process is the production of vanillin from lignosulfonates, which is a byproduct of sulfite pulping. The low yield of 7.5% by mass places this process at a disadvantage over the petrochemical routes to vanillin. (Bjorsvik and Minisci, Organic Process and Research & Development, 1999, 3, 330-340).

Catalytic methods to selectively cleave C—O bonds can valorize the materials and afford valuable chemical products (Chem. Soc. Rev. 2014, 43, 7485-7500; Chem. Rev. 2015, 115, 11559-11624; Chem. Rev. 2018, 118, 614-678; Nat. Rev. Chem. 2020, 4, 311-330). In recent years, oxidative (Rahimi, et al., Nature 2014, 515, 249-252; Rafiee, et al., J. Am. Chem. Soc. 2019, 141, 15266-15276), reductive (Sergeev and Hartwig, Science 2011, 332, 439-443; Abu-Omar, et al. Green Chem. 2015, 17, 1492-1499; Luterbacher, et al. Science, 2016, 354, 329-333; Gao, et al., ACS Catalysis 2016, 6, 7385-7392), and redox neutral (Son and Toste Angew. Chem. 2010, 122, 3879-3882; Lancefield, et al., Angew. Chem. Int. Ed. 2015, 54, 258-262; Bosque, et al., ACS Central Science 2017, 3, 621-628; Nguyen, et al., ACS Catalysis 2019, 800-805) methods have been developed for converting lignin into small molecules (Karkas, et al., Org. Biomol. Chem., 2016, 14, 1853). These methods typically target the β-O-4 linkage, which accounts for 45-60% of lignin polymers. However, previous approaches suffer from a number of drawbacks, such as the requirement of harsh conditions, low yields, and multi-step transformations.

There is a need in the art for efficient and selective generation of small molecules from biomass. The present invention addresses this unmet need.

SUMMARY OF THE INVENTION

In one aspect, the present invention relates to a method of depolymerizing a biopolymer in a biomass, the method comprising the step of contacting the biopolymer with a reaction system comprising at least one catalyst, at least one electron source, and at least one solvent. In one embodiment, the method further comprises the step of extracting the biopolymer from the biomass. In one embodiment, the method further comprises the step of isolating at least one allyl-substituted aromatic compound from the reaction system.

In one embodiment, the at least one catalyst comprises a transition metal complex selected from the group consisting of a titanium metal complex, a zirconium metal complex, and a hafnium metal complex. In one embodiment, the at least one catalyst comprises a metallocene selected from the group consisting of a titanocene metal complex, a zirconocene metal complex, and a hafnocene metal complex. In one embodiment, the reaction system further comprises a silylating agent. In one embodiment, the solvent is selected from the group consisting of water, methanol, ethanol, isopropanol, tert-butanol, ethylene glycol, acetic acid, acetone, dichloromethane, N,N-dimethylformamide, ethyl acetate, acetonitrile, hexane, hexene, octane, pentane, heptane, cyclohexane, iso-octane, toluene, benzene, diethylether, tetrahydrofuran, and combinations thereof. In one embodiment, the solvent comprises tetrahydrofuran. In one embodiment, the biopolymer comprises lignocellulose. In one embodiment, the biopolymer comprises lignin. In one embodiment, the biopolymer comprises lignosulfonate. In one embodiment, the electron source is selected from the group consisting of Zn metal, Mn metal, Fe metal, and In metal. In one embodiment, the temperature of the reaction system is less than 50° C.

In another aspect, the present invention relates to a method of depolymerizing a biopolymer in a biomass, the method comprising the step of contacting the biopolymer with an electrochemical cell comprising at least one catalyst, at least one solvent, at least one electrolyte, an anode, and a cathode. In one embodiment, the method further comprises the step of isolating at least one allyl-substituted aromatic compound from the reaction system.

In one embodiment, the at least one catalyst comprises a transition metal complex selected from the group consisting of a titanium metal complex, a zirconium metal complex, and a hafnium metal complex. In one embodiment, the biomass comprises lignin or lignocellulose. In one embodiment, the cathode comprises zinc, aluminum, iron, platinum, graphite, RVC, or combinations thereof. In one embodiment, the cathode is a sacrificial cathode. In one embodiment, the electrolyte is selected from the group consisting of $Bu_4NPF_6$, $Bu_4NBF_4$, $Bu_4NClO_4$, $Bu_4NBr$, $Bu_4NCl$, $Et_4NPF_6$, $Et_4NBF_4$, $Et_4NClO_4$, $Et_4NBr$, $Et_4NCl$, $H_4NPF_6$, $H_4NBF_4$, $H_4NClO_4$, $H_4NBr$, $H_4NCl$, $LiPF_6$, $LiBF_4$, $LiClO_4$, LiBr, Li Cl, $NaPF_6$, $NaBF_4$, $NaClO_4$, NaBr, NaCl, $KPF_6$, $KBF_4$, $KClO_4$, KBr, KCl, and combinations thereof.

In another aspect, the present invention relates to a method of depolymerizing a biopolymer, the method comprising the steps of providing a biopolymer; adding a photoredox-active functional group to the biopolymer to form a modified biopolymer; and irradiating the modified biopolymer with light in the presence of a reaction mixture;

said mixture comprising a photoredox catalyst. In one embodiment, the photoredox-active functional group is an oxalyl group. In one embodiment, the reaction mixture comprises a base. In one embodiment, the photoredox catalyst is an Ir(III) complex, a Ru(II) complex, or an organic photoredox catalyst.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 2A depicts the production of lignin from plant biomass and a chromatography trace showing the complex mixture of products formed from lignin depolymerization. FIG. 2B shows catalytic strategies to cleave the lignin β-O-4 linkage.

DETAILED DESCRIPTION

Figure 1:
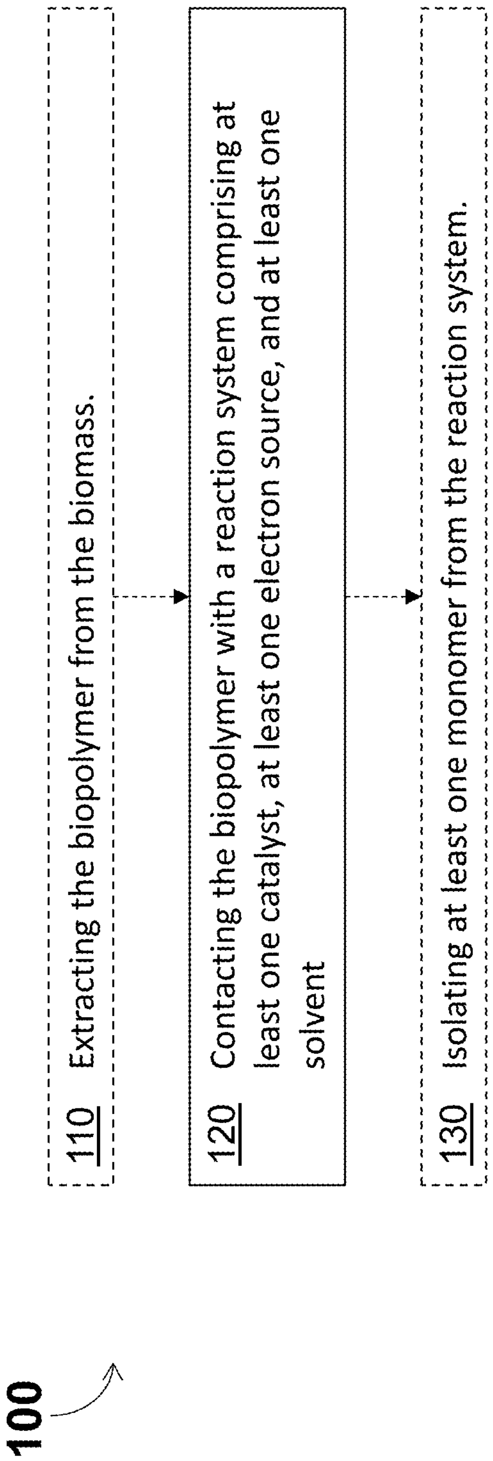
FIG. 1 is a schematic demonstrating exemplary method 100.

The present invention relates to the discovery of novel methods for converting biomass such as lignin into small molecules using a depolymerization methods.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

As used herein, the term "alkyl," by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Other examples include ($C_1$-$C_6$)alkyl, such as, but not limited to, ethyl, methyl, isopropyl, isobutyl, n-pentyl, n-hexyl and cyclopropylmethyl.

As used herein, the term "cycloalkyl" refers to a mono cyclic or polycyclic non-aromatic group, wherein each of the atoms forming the ring (i.e. skeletal atoms) is a carbon atom. In one embodiment, the cycloalkyl group is saturated or partially unsaturated. In another embodiment, the cycloalkyl group is fused with an aromatic ring. Cycloalkyl groups include groups having from 3 to 10 ring atoms. Illustrative examples of cycloalkyl groups include, but are not limited to, the following moieties:

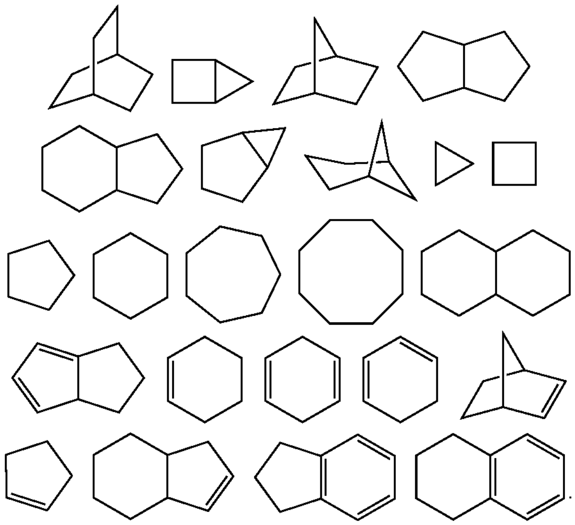

.

Monocyclic cycloalkyls include, but are not limited to, cyclopropyl, cyclobutyl, cyclopentyl, cyclohexyl, cycloheptyl, and cyclooctyl. Dicyclic cycloalkyls include, but are not limited to, tetrahydronaphthyl, indanyl, and tetrahydropentalene. Polycyclic cycloalkyls include adamantine and norbornane. The term cycloalkyl includes "unsaturated nonaromatic carbocyclyl" or "nonaromatic unsaturated carbocyclyl" groups, both of which refer to a nonaromatic carbocycle as defined herein, which contains at least one carbon-carbon double bond or one carbon-carbon triple bond.

As used herein, the term "alkenyl," employed alone or in combination with other terms, means, unless otherwise stated, a stable mono-unsaturated or di-unsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by $—CH_2—CH═CH_2$.

As used herein, the term "alkynyl," employed alone or in combination with other terms, means, unless otherwise stated, a stable straight chain or branched chain hydrocarbon group with a triple carbon-carbon bond, having the stated number of carbon atoms. Non-limiting examples include ethynyl and propynyl, and the higher homologs and isomers. The term "propargylic" refers to a group exemplified by $—CH_2—C≡CH$. The term "homopropargylic" refers to a group exemplified by $—CH_2CH_2—C≡CH$. The term "substituted propargylic" refers to a group exemplified by $—CR_2—C≡CR$, wherein each occurrence of R is independently H, alkyl, substituted alkyl, alkenyl or substituted alkenyl, with the proviso that at least one R group is not hydrogen. The term "substituted homopropargylic" refers to a group exemplified by $—CR_2CR_2—C≡CR$, wherein each occurrence of R is independently H, alkyl, substituted alkyl, alkenyl or substituted alkenyl, with the proviso that at least one R group is not hydrogen.

As used herein, the term "substituted alkyl," "substituted cycloalkyl," "substituted alkenyl" or "substituted alkynyl" means alkyl, cycloalkyl, alkenyl or alkynyl, as defined above, substituted by one, two or three substituents. In one embodiment, the substituents are selected from the group consisting of halogen, —OH, alkoxy, tetrahydro-2-H-pyranyl, $—NH_2$, $—N(CH_3)_2$, (1-methyl-imidazol-2-yl), pyridin-2-yl, pyridin-3-yl, pyridin-4-yl, —C(═O)OH, trifluoromethyl, —C≡N, $—C(═O)O(C_1-C_4)alkyl$, $—C(═O)NH_2$, $—C(═O)NH(C_1-C_4)alkyl$, $—C(═O)N((C_1-C_4)alkyl)_2$, $—SO_2NH_2$, $—C(═NH)NH_2$, and $—NO_2$, In one embodiment, one or two substituents are present and include halogen, —OH, alkoxy, $—NH_2$, trifluoromethyl, $—N(CH_3)_2$, and —C(═O)OH. In one embodiment, the substituents include halogen, alkoxy and —OH. Examples of substituted alkyls include, but are not limited to, 2,2-difluoropropyl, 2-carboxycyclopentyl and 3-chloropropyl.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. Non-limiting examples include $(C_1-C_3)$alkoxy, such as, but not limited to, ethoxy and methoxy.

As used herein, the term "halo" or "halogen" alone or as part of another substituent means, unless otherwise stated, a fluorine, chlorine, bromine, or iodine atom. In one embodiment, halo includes fluorine, chlorine, or bromine. In one embodiment, halo includes fluorine or chlorine.

As used herein, the term "heteroalkyl" by itself or in combination with another term means, unless otherwise stated, a stable straight or branched chain alkyl group consisting of the stated number of carbon atoms and one or two heteroatoms selected from the group consisting of B, O, N, S, and P and wherein the nitrogen, sulfur, and phosphorous atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: $—O—CH_2—CH_2—CH_3$, $—CH_2—CH_2—CH_2—OH$, $—CH_2—CH_2—NH—CH_3$, $—CH_2—S—CH_2—CH_3$, and $—CH_2CH_2—S(═O)—CH_3$. Up to two heteroatoms may be consecutive, such as, for example, $—CH_2—NH—OCH_3$, or $—CH_2—CH_2—S—S—CH_3$ As used herein, the term "heteroalkenyl" by itself or in combination with another term means, unless otherwise stated, a stable straight or branched chain monounsaturated or di-unsaturated hydrocarbon group consisting of the stated number of carbon atoms and one or two heteroatoms selected from the group consisting of B, O, N, S, and P and wherein the nitrogen, sulfur, and phosphorous atoms may optionally be oxidized and the nitrogen heteroatom may optionally be quaternized. Up to two heteroatoms may be placed consecutively. Examples include $—CH═CH—O—CH_3$, $—CH═CH—CH_2—OH$, $—CH_2—CH═N—OCH_3$, $—CH═CH—N(CH_3)—CH_3$, and $—CH_2—CH═CH—CH_2—SH$.

As used herein, the term "aromatic" refers to a carbocycle or heterocycle with one or more polyunsaturated rings and having aromatic character, i.e., having (4n+2) delocalized p (pi) electrons, where n is an integer.

As used herein, the term "aryl," employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl. In one embodiment, aryl includes phenyl and naphthyl. In one embodiment, the aryl is phenyl.

As used herein, the term "aryl-$(C_1-C_3)$alkyl" or "arylalkyl" means a functional group wherein a one to three carbon alkylene chain is attached to an aryl group, e.g., $—CH_2CH_2$-phenyl or $—CH_2$-phenyl (benzyl). Preferred is aryl-$CH_2$— and aryl-$CH(CH_3)$—. The term "substituted aryl-$(C_1-C_3)$alkyl" means an aryl-$(C_1-C_3)$alkyl functional group in which the aryl group is substituted. In one embodiment, the arylalkyl is substituted aryl$(CH_2)$—. Similarly, the term "heteroaryl-$(C_1-C_3)$alkyl" means a functional group wherein a one to three carbon alkylene chain is attached to a heteroaryl group, e.g., $—CH_2CH_2$-pyridyl. In one embodiment, the heteroaryl-$(C_1-C_3)$alkyl is heteroaryl-$(CH_2)$—. The term "substituted heteroaryl-$(C_1-C_3)$alkyl" means a heteroaryl-$(C_1-C_3)$alkyl functional group in which the heteroaryl group is substituted. In one embodiment, the substituted heteroaryl-$(C_1-C_3)$alkyl is substituted heteroaryl-$(CH_2)$—.

As used herein, the term "heterocycle" or "heterocyclyl" or "heterocyclic" by itself or as part of another substituent means, unless otherwise stated, an unsubstituted or substituted, stable, mono- or multi-cyclic heterocyclic ring system that consists of carbon atoms and at least one heteroatom selected from the group consisting of B, O, N, S, and P and wherein the nitrogen, sulfur, and phosphorous heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl. A polycyclic heteroaryl may include one or more rings that are partially saturated. Examples include the following moieties:

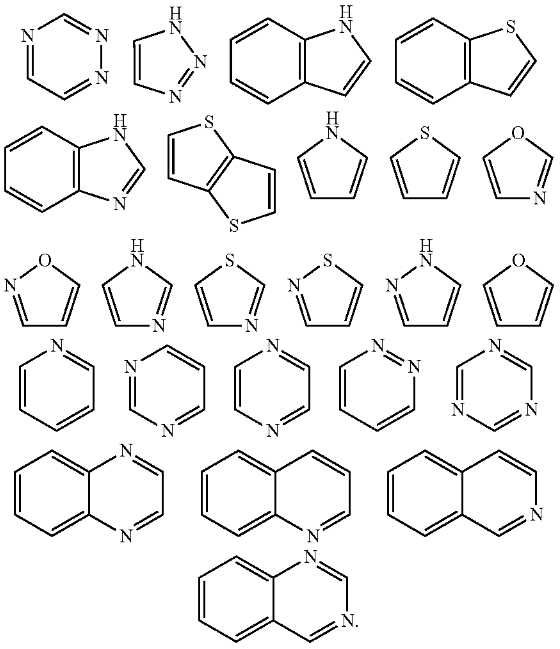

As used herein, the term "heterocycloalkyl" or "heterocyclyl" refers to a heteroalicyclic group containing one to four ring heteroatoms each selected from B, O, S, N, and P. In one embodiment, each heterocycloalkyl group has from 4 to 10 atoms in its ring system, with the proviso that the ring of said group does not contain two adjacent O or S atoms. In another embodiment, the heterocycloalkyl group is fused with an aromatic ring. In one embodiment, the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

An example of a 3-membered heterocycloalkyl group includes, and is not limited to, aziridine. Examples of 4-membered heterocycloalkyl groups include, and are not limited to, azetidine and a beta lactam. Examples of 5-membered heterocycloalkyl groups include, and are not limited to, pyrrolidine, oxazolidine and thiazolidinedione. Examples of 6-membered heterocycloalkyl groups include, and are not limited to, piperidine, morpholine and piperazine. Other non-limiting examples of heterocycloalkyl groups are:

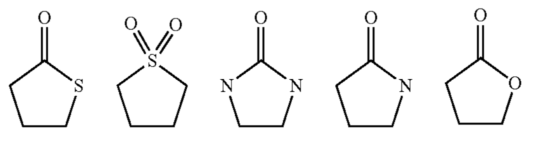

-continued

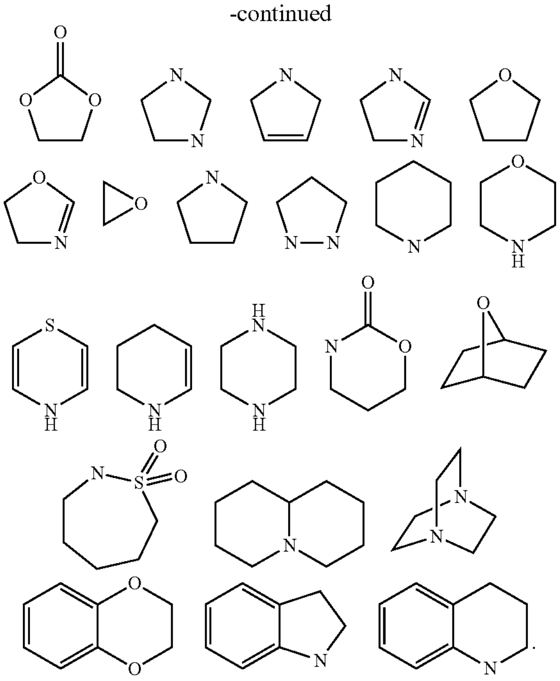

Examples of non-aromatic heterocycles include monocyclic groups such as aziridine, oxirane, thiirane, azetidine, oxetane, thietane, pyrrolidine, pyrroline, pyrazolidine, imidazoline, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin, and hexamethyleneoxide.

As used herein, the term "heteroaryl" or "heteroaromatic" refers to a heterocycle having aromatic character. A polycyclic heteroaryl may include one or more rings that are partially saturated. Examples include the following moieties:

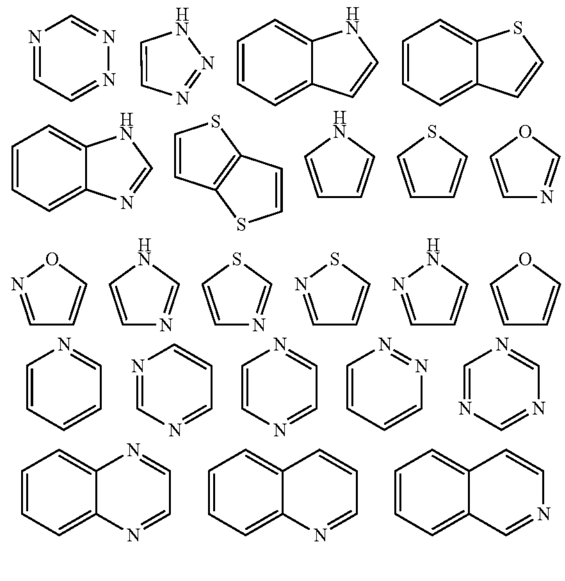

-continued

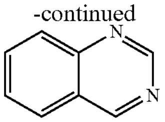

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclyl and heteroaryl moieties is intended to be representative and not limiting.

As used herein, the term "substituted" means that an atom or group of atoms has replaced hydrogen as the substituent attached to another group. The term "substituted" further refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two.

As used herein, the term "optionally substituted" means that the referenced group may be substituted or unsubstituted. In one embodiment, the referenced group is optionally substituted with zero substituents, i.e., the referenced group is unsubstituted. In another embodiment, the referenced group is optionally substituted with one or more additional group(s) individually and independently selected from groups described herein.

In one embodiment, the substituents are independently selected from the group consisting of oxo, halogen, —CN, —$NH_2$, —OH, —$NH(CH_3)$, —$N(CH_3)_2$, alkyl (including straight chain, branched and/or unsaturated alkyl), substituted or unsubstituted cycloalkyl, substituted or unsubstituted heterocycloalkyl, fluoro alkyl, substituted or unsubstituted heteroalkyl, substituted or unsubstituted alkoxy, fluoroalkoxy, —S-alkyl, $S(=O)_2$alkyl, —C(=O)NH[substituted or unsubstituted alkyl, or substituted or unsubstituted phenyl], —C(=O)N[H or alkyl]$_2$, —OC(=O)N[substituted or unsubstituted alkyl]$_2$, —NHC(=O)NH [substituted or unsubstituted alkyl, or substituted or unsubstituted phenyl], —NHC(=O)alkyl, —N[substituted or unsubstituted alkyl]C(=O)[substituted or unsubstituted alkyl], —NHC(=O)[substituted or unsubstituted alkyl], —C(OH)[substituted or unsubstituted alkyl]$_2$, and —C($NH_2$)[substituted or unsubstituted alkyl]$_2$. In one embodiment, by way of example, an optional substituent is selected from oxo, fluorine, chlorine, bromine, iodine, —CN, —$NH_2$, —OH, —$NH(CH_3)$, —$N(CH_3)_2$, —$CH_3$, —$CH_2CH_3$, —$CH(CH_3)_2$, —$CF_3$, —$CH_2CF_3$, —$OCH_3$, —$OCH_2CH_3$, —$OCH(CH_3)_2$, —$OCF_3$, —$OCH_2CF_3$, —S(↑O)$_2$—$CH_3$, —$SO_3H$, —C(=O)—$NHCH_3$, —NHC(=O)$NHCH_3$, —C(=O)$CH_3$, and —C(=O)OH. In one embodiment, the substituents are independently selected from the group consisting of $C_{1-6}$ alkyl, —OH, $C_{1-6}$ alkoxy, halo, amino, acetamido, oxo and nitro. In yet another embodiment, the substituents are independently selected from the group consisting of $C_{1-6}$ alkyl, $C_{1-6}$ alkoxy, halo, acetamido, and nitro. As used herein, where a substituent is an alkyl or alkoxy group, the carbon chain may be branched, straight or cyclic, with straight being preferred. In one embodiment, the substituents are positively or negatively charged groups consisting of —$NR_3^+$, —$SO_3^-$, or related species.

For aryl, aryl-($C_1$-$C_3$)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In one embodiment, the substituents vary in number between one and three. In one embodiment, the substituents vary in number between one and two.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DESCRIPTION

In one aspect, the present invention relates to a method of depolymerizing a biopolymer in a biomass. Exemplary method 100 (FIG. 1) comprises step 120, wherein the biopolymer is contacted with a reaction system comprising at least one catalyst, at least one electron source, and at least one solvent.

In one embodiment, the biomass may comprise a variety of biopolymers, including but not limited to lignin and polysaccharides such as cellulose and hemicellulose. In some embodiments, the biomass may be treated such that the lignin biopolymer is separated from the polysaccharide biopolymers. In one embodiment, the biomass is not treated to separate individual varieties of biopolymer.

Biopolymer Sources

The present invention relates to the depolymerization of biopolymers from biomass. In one aspect, the present invention relates to the extraction of biopolymers from biomass. A biomass of the present invention comprises at least one biopolymer. Any biopolymer that can undergo a depolymerization reaction is contemplated for use within the systems and methods of the present invention, as would be understood by one skilled in the art. Non limiting examples of biopolymers include lignocelluloses and isolated lignins. In some embodiments, the biopolymer is treated prior to depolymerization. In one embodiment, the lignin is a lignosulfonate. In one embodiment, the lignosulfonate is a lignin biopolymer comprising at least one sulfonate group $(—OSO_3)^-$. In certain embodiments, the biopolymer is lignin.

As used herein, the term "biomass" refers to any carbon-containing source of energy or chemicals that is renewable on human timescales. The biomass may be from any source. Biomass may be derived from a single source, or biomass can comprise a mixture derived from more than one source; for example, biomass could comprise a mixture of grass and leaves. Biomass includes, but is not limited to, bioenergy crops, agricultural residues, municipal solid waste, industrial solid waste, sludge from paper manufacture, yard waste, wood and forestry waste or a combination thereof. Examples of biomass include, but are not limited to, algae and other marine plants, non-animal oils, palm trees, palm waste biomass such as empty fruit bunches, rapeseed oil, corn grain, corn cobs, crop residues such as corn husks, corn stover, grasses, wheat, wheat straw, barley, barley straw, hay, rice straw, switchgrass, waste paper, sugar cane bagasse, sorghum, soy, components obtained from milling of grains, trees, branches, roots, leaves, wood chips, sawdust, shrubs and bushes, vegetables, fruits and fruit pulps, flowers, and animal manure or a combination thereof. In one embodiment, the biomass is any source of biomass which may yield polymers, oligomers, and/or monomers at least partially comprising an aromatic molecular structure.

In one aspect of the present invention, the biopolymer source is wood biomass. Examples of wood biomass include wood chips, bark, wood shavings, and sawdust. With regard to wood variety, softwood or hardwood may be used. Hardwood trees include, but are not limited to, ash, *eucalyptus*, aspen, birch, cherry, elm, hazel, palm, poplar, mahogany, maple, oak and teak. Softwood trees include, but are not limited to, pine, spruce and cedar.

In some embodiments, the biomass is further processed into a powder using any suitable technique including, but not limited to, grinding, milling, etc. In one embodiment, the grinding operation can be carried out using a suitable processing agent to prevent agglomeration of the particles during grinding. In still another embodiment, the particles can be produced by grinding or milling in the presence of another suitable material to affect the biomass in a desired manner. In one embodiment, the biomass is ground and/or milled and filtered to exclude particles of a certain size. In one embodiment, the biomass is ground and/or milled and passed through a 20-mesh screen.

In some embodiments, the biomass is dried or dewatered prior to being processed by the systems and methods of the present invention. The term "dewatered" as used herein refers to the removal of at least some water. Methods of drying or dewatering biomass are known in the art. Non-limiting methods of drying biomass include ambient air drying, forced air drying, kiln drying, torrefaction, and lyophilization. Non-limiting methods of dewatering biomass include filtration, centrifugation, heating, sedimentation or flotation. In other embodiments, the biomass is wet when processed by the systems and methods of the present invention. In some embodiments, the biomass is processed prior to being subjected to the depolymerization process. In other embodiments, the biomass is not processed prior to the depolymerization process.

In one embodiment, method 100 further comprises step 110, wherein the biopolymer is extracted from the biomass. Any method for extraction known in the art is contemplated for use within the present invention, as would be understood by one skilled in the art. In one embodiment, the biomass is ground to fine particles and stirred in an appropriate amount of solvent for a period of time, after which time the solvent containing the dissolved biopolymer is separated from insoluble material, the solvent is removed, and the biopolymer is isolated. In one embodiment, the biopolymer is extracted using organic extraction, drying, heating, separation techniques such as Kraft, soda pulping, mechanical pulping, steam explosion, enzymatic or carbohydrate digestion methods such as fermentation and acid hydrolysis, or reductive or oxidative methods. In one embodiment, at least one solvent is used to extract the biopolymer from the biopolymer source. In another embodiment, at least two solvents are used to extract the biopolymer from the biopolymer source. In certain embodiments, the solvent is heated during the extraction procedure. In one embodiment, the solvent is heated to reflux. In one embodiment, the biomass is pretreated under elevated pressures and temperatures (above room temperature). Such methods include hot water and steam treatments, ammonia treatments and sulfite treatments. In one embodiment, the biomass is treated with an alkaline hydrogen peroxide (AHP) process.

In one embodiment, the biomass is treated with an alkaline solution. In one embodiment, said alkaline solution may comprise a base including but not limited to hydroxides such as NaOH, KOH, $Ca(OH)_2$, and $Mg(OH)_2$; carbonates such as $Na_2CO_3$; bicarbonates such as $NaHCO_3$; water-soluble silicates such as $NaSiO_3$, and combinations thereof. In one embodiment, said alkaline solution further comprises water.

In one embodiment, the biomass is treated with a copper-catalyzed alkaline hydrogen peroxide (Cu-AHP) process as would be understood by one of skill in the art. In one embodiment, the copper comprises free copper ion, a copper salt or a copper-coordination compound complex in a concentration of 0.001-50%. In one embodiment, the copper coordination complex is a neutral, cationic or anionic compound which creates a coordination bond with Cu(I), Cu(II) or Cu(III) ions and catalyzes a redox reaction. Both monodentate and multidentate ligands can be applied in this invention. The coordination compounds include compounds containing nitrogen, such as pyridine, histidylglycine, phthalocyanine, acetonitrile; compounds containing a hydroxyl group, such as catechol; compounds containing ether, such as 18-crown-6; compounds containing sulfur, such as mercaptosuccinic acid; or compounds containing olefinic double bonds, such as 1,3-cyclohexadiene. In one embodiment, the biomass is treated with a copper(II) 2,2'-bipyridine complex (Cu(bpy)) modified to contain at least one additional metal-coordinating ligand, such as pyridine; 1,10-phenanthroline; ethylenediamine; histidine; and/or glycine.

Depolymerization

The present invention provides systems and methods for the depolymerization of a biopolymer into a monomer. The present invention also provides systems and methods for the depolymerization of a biopolymer into a mixture of monomers.

In one embodiment, the at least one catalyst comprises a transition metal complex. Exemplary transition metals include, but are not limited to, titanium (Ti), vanadium (V), chromium (Cr), manganese (Mn), iron (Fe), cobalt (Co), zirconium (Zr), niobium (Nb), molybdenum (Mo), hafnium (Hf), tantalum (Ta), tungsten (W), rhenium (Re), osmium (Os). In one embodiment, the transition metal is a Group 4 metal such as titanium, zirconium, or hafnium.

In one embodiment, the transition metal complex comprises a titanium complex. Exemplary titanium complexes include, but are not limited to, titanium acetate, titanium catecholate, titanium diethanolamine complex, titanium diisopropoxide bis(acetylacetonate), titanium di-n-butoxide (bis-2,4-pentanedionate), titanium lactate, titanium nitrate, titanium potassium hexafluoride, titanium sulfate, titanium tetrachloride, titanium triethanolamine complex, titanium (III) chloride, titanium(III) bromide, titanium(III) iodide, titanium(III) fluoride, titanium(III) oxide, titanium(IV) (triethanolaminato)isopropoxide, titanium(IV) 2-ethylhexoxide, titanium(IV)bis(ammonium lactato)dihydroxide, titanium(IV) bromide, titanium(IV) butoxide, titanium(IV) chloride, titanium(IV) chloride tetrahydrofuran complex, titanium(IV) chloride triisopropoxide, titanium(IV) diisopropoxide (bis-2,4-pentanedionate), titanium(IV) diisopropoxide bis(2,2,6,6-tetramethyl-3,5-heptanedionate), titanium (IV) diisopropoxide bis(ethylacetoacetate), titanium(IV) ethoxide, titanium(IV) iodide, titanium(IV) isopropoxide, titanium(IV) methoxide, titanium(IV) n-butoxide, titanium (IV) oxide, titanium(IV) oxyacetylacetonate, titanium(IV) oxysulfate, titanium(IV) propoxide, titanium(IV) sulfide, titanium(IV) tert-butoxide, trichloro[hydrotris(pyrazol-1-yl) borato]titanium(IV), and bis(N-2',6'-diisopropylphenyl(phenyl)amidate)titanium bis(dimethylamido).

In one embodiment, the transition metal complex comprises a titanocene complex. Exemplary titanocene complexes include, but are not limited to, bis(cyclopentadienyl) titanium dichloride, bis(cyclopentadienyl)titanium dibromide, bis(cyclopentadienyl)titanium difluoride, bis(cyclopentadienyl)titanium diiodide, bis(indenyl)titanium dichloride, bis(indenyl)titanium diphenyl, bis(methylcyclopentadienyl)titanium diphenyl, bis(methylcyclopentadienyl) titanium dihalide, titanocene bis(trifluoromethanesulfonate), bis(cyclopentadienyl)titanium (IV) pentasulfide, bis(cyclopentadienyl)titanium dibenzyl, bis(cyclopentadienyl)titanium dimethyl, bis(cyclopentadienyl)titanium di-neopentyl, bis(cyclopentadienyl)titanium diphenyl, bis(cyclopentadienyl)titanium ethyl chloride, bis(cyclopentadienyl)titanium methyl bromide, bis(cyclopentadienyl)titanium methyl chloride, bis(cyclopentadienyl)titanium phenyl chloride, Bis(cyclopentadienyl)titanium(IV) bis(trifluoromethanesulfonate), bis(1,2-diethylcyclopentadienyl)titanium dichloride, bis(1,2-dimethylcyclopentadienyl)titanium dichloride, bis(1,2-dimethylcyclopentadienyl)titanium diphenyl, the carbene represented by the formula bis(cyclopentadienyl)titanium=$CH_2$ and derivatives of this reagent, tetrahydrofluorenyltitanium trichloride, tetrahydrofluorenyltitanium trimethyl, tetrahydroindenyltitanium tribenzyl, tetrahydroindenyltitanium trimethyl, racemic-ethylene bis (4,5,6,7-tetrahydro-1-indenyl) titanium (IV) dichloride, racemic-ethylene bis (1-indenyl) titanium (IV) dichloride, racemic-dimethylsilyl bis (4,5,6,7-tetrahydro-1-indenyl) titanium (IV) dichloride, racemic-dimethylsilyl bis (1-indenyl) titanium (IV) dichloride, racemic-1,1,2,2-tetramethylsilanylene bis (4,5,6,7-tetrahydro-1-indenyl) titanium (IV) dichloride, racemic-1,1,2,2-tetramethylsilanylene bis (1-indenyl) titanium (IV) dichloride, octahydrofluorenyltitanium trichloride, octahydrofluorenyltitanium trimethyl, pentaethylcyclopentadienyl titanium trichloride, pentamethylcyclopentadienyl titanium trichloride, pentamethylcyclopentadienyltitanium dimethylchloride, pentamethylcyclopentadienyltitanium dimethylmethoxide, pentamethylcyclopentadienyltitanium tribenzyl, pentamethylcyclopentadienyltitanium trimethyl, pentamethylcyclopentadienyltitaniumtriisopropyl, methyl phosphine dicyclopentadienyl titanium diphenyl, methyl phosphine dicyclopentadienyl titanium dichloride, methylenedicyclopentadienyl titanium diphenyl, methylenedicyclopentadienyl titanium dichloride, isopropyl(cyclopentadienyl)(fluorenyl)titanium dichloride, indenyltitanium trichloride, indenyltitanium triethyl, indenyltitanium trimethyl, indenyltitanium triphenyl, indenyltitanium tripropyl, indenylfluorenyltitanium diethyl, ethylidene (1-indenyl-2,3,4,5-tetramethyl-1-cyclopentadienyl) titanium IV) dichloride; ditertbutylmethylene(cyclopentadienyl)(fluorenyl)titanium dichloride, diphenylmethylene(cyclopentadienyl) (fluorenyl)titanium dichloride, dimethyl silyldicyclopentadienyl titanium diphenyl, dimethyl silyldicyclopentadienyl titanium dichloride, diisopropylmethylene (cyclopentadienyl)(fluorenyl)titanium dichloride, cyclopentadienyltitanium (IV) trichloride, cyclopentadienyltitanium diisopropyl, cyclopentadienyltitanium dimethylchloride, cyclopentadienyltitanium dimethylmethoxide, cyclopentadienyltitanium tribenzyl, cyclopentadienyltitanium triethyl, cyclopentadienyltitanium triisopropyl, cyclopentadienyltitanium trimethyl, cyclopentadienyltitanium triphenyl, cyclopentadienyltitanium-2,4-pentadienyl, cyclohexylidene(cyclopentadienyl)(fluorenyl)titanium dichloride, bis-$\eta^5$-2,4-cyclopentadien-1-yl)bis[2,6-difluoro-3-(1H-pyrrol-1-yl) phenyl]titanium dichloride, bisindenyltitanium dichloride, bisindenyltitanium dimethyl, bisindenyltitanium methyl(2-(dimethylamino)benzyl), bisindenyltitanium methyltrimethylsilyl, bispentamethylcyclopentadienyltitanium diflouride, bispentamethylcyclopentadienyltitanium dichloride, bispentamethylcyclopentadienyltitanium dibromide, bispentamethylcyclopentadienyltitanium diiodide, bispentamethylcyclopentadienyltitanium diisopropyl, bispentamethylcyclopentadienyltitanium dimethyl, bispentamethylcyclopentadienyltitanium methylchloride, bispentamethylcyclopentadienyltitanium methylmethoxide, bistetrahydroindenyltitanium methyltrimethylsilyl, bistetrahydroindenyltitanium dichloride, bis-2,4-cyclopentadien-1-yl)bis[2,6-difluoro-3-(1H-pyrrol-1-yl)phenyl]titanium, biscyclopentadienyltitanium dichloride, biscyclopentadienyltitanium dibromide, biscyclopentadienyltitanium diethyl, biscyclopentadienyltitanium diphenyl, biscyclopentadienyltitanium methylchloride, biscyclopentadienyltitanium methylmethoxide, biscyclopentadienyltitanium-2,4-pentadienyl, bis(pentamethylcyclopentadienyl) titanium diphenyl, bis(pentamethylcyclopentadienyl) titanium dichloride, (indenyl)titanium (IV) trichloride, (methylene-bis-pentamethylcyclopentadienyl)titanium (III) 2-(dimethylamino)benzyl, (pentamethylcyclopentadienyl) titanium (IV) trichloride, (tert-butylamido)(1,1-dimethyl-2,3,4,9,10-$\eta$-1,4,5,6,7,8-hexahydronaphthalen-4-yl) dimethylsilanetitanium dimethyl, (tert-butylamido)(1,1-dimethyl-2,3,4,9,10-$\eta$-1,4,5,6,7,8-hexahydronaphthalen-4-yl)dimethylsilanetitanium dichloride, (tert-butylamido)(2,3-dimethylindenyl)dimethylsilanetitanium (II) 1,4diphenyl-1,3-butadiene, (tert-butylamido)(2,3-dimethylindenyl) dimethylsilanetitanium (II) 1,3-pentadiene, (tert-butylamido)(2,3-dimethylindenyl)dimethylsilanetitanium (IV) 1,3-butadiene, (tert-butylamido)(2,3-dimethylindenyl) dimethylsilanetitanium (IV) dichloride, (tert-butylamido)(2,4-dimethyl-1,3-pentadien-2-yl)dimethylsilanetitanium dichloride, (tert-butylamido)(2-methyl-4-phenylindenyl)dimethylsilanetitanium (II) 1,4-diphenyl-1,3-butadiene, (tert-butylamido)(2-methylindenyl)dimethylsilanetitanium (II) 1,3-pentadiene, (tert-butylamido)(2-methylindenyl)dimethylsilanetitanium (II) 1,4-diphenyl-1,3-butadiene, (tert-butylamido)(2-methylindenyl)dimethylsilanetitanium (IV) 1,3-butadiene, (tert-butylamido)(2-methylindenyl) dimethylsilanetitanium (IV) dichloride, (tert-butylamido) (tetramethyl-$\eta^5$-cyclopentadienyl)-1,2-ethanediyltitanium dichloride, (tert-butylamido)(tetramethyl-$\eta^5$-cyclopentadienyOdimethylsilane titanium (III) 2-(dimethylamino)benzyl, (tert-butylamido)(tetramethyl-η$^5$-cyclopentadienyl)dimethylsilanetitanium dichloride, (tert-butylamido)(tetramethyl-η$^5$-cyclopentadienyl)dimethylsilanetitanium dimethyl, (tert-butylamido)(tetramethyl-η$^5$-cyclopentadienyl)dimethylsilanetitanium (III) allyl, (tert-butylamido)(tetramethyl-η$^5$-cyclopentadienyl)dimethylsilanetitanium (II) 1,4-diphenyl-1,3-butadiene, (tert-butylamido)(tetramethyl-η$^5$-cyclopentadienyl)dimethylsilanetitanium (IV) 1,3-butadiene, (tert-butylamido)(tetramethylq-cyclopentadienyl)dimethylsilanetitanium (II) 1,4-dibenzyl-1,3-butadiene, (tert-butylamido)(tetramethyl-η$^5$-cyclopentadienyl) dimethylsilanetitanium (II) 2,4-hexadiene, (tert-butylamido)(tetramethyl-η$^5$-cyclopentadienyl)dimethylsilanetitanium (II) 3-methyl-1,3-pentadiene, (tert-butylamido)(tetramethyl-η$^5$-indenyl)dimethylsilanetitanium dichloride, (η$^5$-2,4-dimethyl-1,3-pentadienyl)titanium trichloride, (dimethylsilyl-bis-pentamethylcyclopentadienyl)titanium-2,4-pentadienyl, (1,1,2,3-tetramethyl-2,3,4,9,10-η-1,4,5,6,7,8-hexahydronaphthalenyl)titanium trimethyl, (1,1-dimethyl-2,3,4,9,10-η-1,4,5,6,7,8-hexahydronaphthalenyl)titanium trimethyl, (4R,5R)-chloro-cyclopentadienyl-[2,2-dimethyl-1,3-dioxolan-4,5-bis(diphenylmethoxy)]titanium, and (4S,5S)-chloro-cyclopentadienyl-[2,2-dimethyl-1,3-dioxolan-4,5-bis(diphenylmethoxy)]titanium.

In one embodiment, the transition metal complex comprises a zirconium complex. Exemplary zirconium complexes include, but are not limited to, zirconium acetylacetonate, zirconium acrylate, zirconium carboxyethyl acrylate, zirconium ethanoate, zirconium lactate, zirconium malate, zirconium propanoate, zirconium(IV) acetylacetonate, zirconium(IV) butoxide, zirconium(IV) carbonate, zirconium(IV) chloride, zirconium(IV) ethoxide, zirconium (IV) fluoride, zirconium(IV) hydrogenphosphate, zirconium (IV) oxide, zirconium(IV) propoxide, zirconium(IV) tert-butoxide, zirconyl nitrate, tetrakis(ethylmethylamido) zirconium(IV), potassium zirconium carbonate, n-propyl zirconate, hexafluorozirconic acid, and ammonium zirconium carbonate.

In one embodiment, the transition metal complex comprises a zirconocene complex. Exemplary zirconocene complexes include, but are not limited to, bis(cyclopentadienyl) zirconium dichloride, bis(cyclopentadienyl)zirconium difluoride, bis(cyclopentadienyl)zirconium dibromide, bis (cyclopentadienyl)zirconium diiodide, bis(cyclopentadienyl)zirconium dibenzyl, bis(cyclopentadienyl)zirconium dimethyl, bis(cyclopentadienyl)zirconium di-neopentyl, bis (cyclopentadienyl)zirconium diphenyl, bis(cyclopentadienyl)zirconium ethyl chloride, bis(cyclopentadienyl)zirconium methyl chloride, bis(cyclopentadienyl)zirconium phenyl chloride, bis(cyclopentadienyl)zirconium(IV) bis (trifluoromethanesulfonate), bis(cyclopentadienyl)zirconium(IV) chloride hydride, bis(cyclopentadienyl)zirconium (IV) dihydride, bis(butylcyclopentadienyl)zirconium(IV) dichloride, racemic-ethylene bis (4,5,6,7-tetrahydro-1-indenyl) zirconium (IV) dichloride, racemic-ethylene bis (1-indenyl)zirconium (IV) dichloride, racemic-dirmethylsilyl bis (4,5,6,7-tetrahydro-1-indenyl) zirconium (IV) dichloride, racemic-dimethylsilyl bis (1-indenyl) zirconium (IV) dichloride, racemic-dimethylsilyl bis (2-methyl-1-indenyl) zirconium (IV) dichloride, racemic-dimethylsilyl bis (2-methyl-4-(1-naphthyl-1-indenyl) zirconium (IV) dichloride, racemic-dimethylsilyl bis (2-methyl-4-phenyl-1-indenyl) zirconium (IV) dichloride, racemic-dimethylsilyl bis (2-methyl-4-t-butyl-1-cyclopentadienyl) zirconium (IV) dichloride, racemic-1,1,2,2-tetramethylsilanylene bis (4,5,6,7-tetrahydro-1-indenyl) zirconium (IV) dichloride, racemic-1,1,2,2-tetramethylsilanylene bis (1-indenyl) zirconium (IV) dichloride, isopropyl(cyclopentadienyl)(fluorenyl)zirconium dichloride, isopropyl(cyclopentadienyl)(octahydrofluorenyl)zirconium dichloride, diphenylmethylene (cyclopentadienyl)(fluorenyl)zirconium dichloride, ditertbutylmethylene(cyclopentadienyl)(fluorenyl)zirconium dichloride, ethylidene (1-indenyl tetramethylcyclopentadienyl) zirconium (IV) dichloride, dimethylbis(pentamethylcyclopentadienyl)zirconium(IV), diisobutylmethylene (cyclopentadienyl)(fluorenyl) zirconium dichloride, diisopropylmethylene(2,5-dimethylcyclopentadienyl)(fluorenyl)zirconium dichloride, diisopropylmethylene(cyclopentadienyl)(fluorenyl)zirconium dichloride, dichloro[rac-ethylenebis(4,5,6,7-tetrahydro-1-indenyl)]zirconium(IV), dichloro[rac-ethylenebis(indenyl)]zirconium(IV), dichloro-bis(1-neomenthylindenyl)-zirconium, cyclopentadienyl zirconium trimethyl, cyclopentadienyl zirconium trineopentyl, cyclopentadienyl zirconium triphenyl, cyclohexylidene(cyclopentadienyl)(fluorenyl) zirconium dichloride, biscyclopentadienylzirconium dibenzyl, biscyclopentadienylzirconium dimethyl, (isopropylidene)(cyclopentadienyl) (fluorenyl)zirconium dibenzyl, (dimethylsilyl-bis-t-butylcyclopentadienyl)zirconium dichloride, (dimethylsilyl-bis-tetrahydrofluorenyl) zirconium dichloride, (dimethylsilyl-bis-tetrahydrofluorenyl)zirconium di(trimethylsilyl), (dimethylsilyl-bis-tetrahydroindenyl)zirconium (II) 1,4-diphenyl-1,3-butadiene, (dimethylsilylpentamethylcyclopentadienylfluorenyl)zirconium dichloride, (dimethylsilylpentamethylcyclopentadienylfluorenyl)zirconium dimethyl, (dimethylsilyl-bis-2-methyl-4-phenylindenyl) zirconium (II) 1,4-diphenyl-1,3-butadiene, (dimethylsilyl-bis-2-methyl-4-phenylindenyl)zirconium dimethyl, (dimethylsilyl-bis-2-methylindenyl)zirconium dichloride, (dimethylsilyl-bis-2-methylindenyl)zirconium dimethyl, (dimethylsilyl-bis-2-methylindenyl)zirconium-1,4-diphenyl-1,3-butadiene, (dimethylsilyl-bis-cyclopentadienyl)zirconium dichloride, (dimethylsilyl-bis-cyclopentadienyl)zirconium dimethyl, (dimethylsilyl-bis-indenyl)zirconium dichloride, and (dimethylsilyl-bis-fluorenyl)zirconium dichloride.

In one embodiment, the transition metal complex comprises a hafnium complex. Exemplary hafnium complexes include, but are not limited to, tetrakis(ethylmethylamido) hafnium(IV), hafnium(IV) carbide, hafnium(IV) chloride, hafnium(IV) fluoride, hafnium(IV) iodide, hafnium(IV) n-butoxide, hafnium(IV) oxychloride, hafnium(IV) sulfate, and hafnium(IV) trifluoromethanesulfonate.

In one embodiment, the transition metal complex comprises a hafnocene. Exemplary hafnocenes include, but are not limited to, bis(cyclopentadienyl)hafnium dichloride, bis (cyclopentadienyl)hafnium difluoride, bis(cyclopentadienyl)hafnium dibromide, bis(cyclopentadienyl)hafnium diiodide, racemic-ethylene bis (4,5,6,7-tetrahydro-1-indenyl) hafnium (IV) dichloride, racemic-ethylene bis (1-indenyl) hafnium (IV) dichloride, racemic-dimethylsilyl bis (4,5,6,7-tetrahydro-1-indenyl) hafnium (IV) dichloride, racemic-1,1,2,2-tetramethylsilanylene bis (4,5,6,7-tetrahydro-1-indenyl) hafnium (IV) dichloride, racemic-1,1,2,2-tetramethylsilanylene bis (1-indenyl) hafnium (IV) dichloride, isopropyl(cyclopentadienyl)(fluorenyl)hafnium dichloride, indenylhafnium(IV) trichloride, ethylidene (1-indenyl-2,3,4,5-tetramethyl-1-cyclopentadienyl) hafnium (IV) dichloride, diphenylmethylene(cyclopentadienyl)(fluorenyl) hafnium dichloride, ditertbutylmethylene(cyclopentadienyl)(fluorenyl)-hafnium dichloride, diisopropylmethylene(2,5-dimethylcyclopentadienyl) (fluorenyl)-hafnium dichloride, diisopropylmethylene(cyclopentadienyl)(fluorenyl)hafnium dichloride, diisobutylmethylene(cyclopentadienyl)(fluorenyl)hafnium dichloride, cyclopentadienylhafnium(IV) trichloride, cyclopentadienyl hafnium trimethyl, cyclopentadienyl hafnium trineopentyl, cyclopentadienyl hafnium triphenyl, cyclohexylidene(cyclopentadienyl)(fluorenyl)hafnium dichloride, bis(indenyl)halfnium(IV) dichloride, bis(cyclopentadienyl)hafnium dimethyl, and bis(cyclopentadienyl)hafnium diphenyl.

In one embodiment, the transition metal complex has an oxidation state of +4. In one embodiment, the transition metal complex has an oxidation state of +3. In one embodiment, the transition metal complex is reduced in situ. In one embodiment, the compounds of the present invention are pre-catalysts. In one embodiment, the compounds of the present invention are converted to active catalysts upon exposure to reaction conditions. In one embodiment, the oxidation state of the transition metal complex cycles between +3 and +4 over the course of the reaction.

The electron source may be any electron source known to one of skill in the art. In one embodiment, the electron source is a transition metal or a metallic element. In one embodiment, the electron source is pure (uncharged) element. Exemplary metals include sodium (Na), magnesium (Mg), potassium (K), calcium (Ca), aluminum (Al), titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), hafnium (Hf), tantalum (Ta), tungsten (W), rhenium (Re), and osmium (Os). In one embodiment, the electron source comprises a common organic or inorganic reductant known of skill to those in the art. Exemplary organic or inorganic reductants include, but are not limited to, hydride sources such as $BH_3$, $NaBH_4$, and $LiAlH_4$; silanes such as $Et_3SiH$, $(EtO)_3SiH$, $PhSiH_3$, $Ph_3SiH$, and $(Me_3SiO)_2SiMeH$; and organosilicon reductants such as 1,4-bis(trimethylsilyl)-1,4-dihydropyrazine, 2,5-dimethyl-1,4-bis(trimethylsilyl)-1,4-diaza-2,5-cyclohexadiene, 2,3,5,6-tetramethyl-1,4-bis(trimethylsilyl)-1,4-dihydropyrazine, and 1,1'-bis(trimethylsilyl)-1,1'-dihydro-4,4'-bipyridine.

In one embodiment, the catalyst of the present invention is supported on a catalyst support. Examples of catalyst supports include, but are not limited to, oxides such as silica, alumina, basic alumina, titania, and zirconia; barium sulfate; calcium carbonate; carbon, particularly acid washed carbon and activated carbon; and combinations thereof. The catalyst support can be in the form of powder, granules, pellets, or the like. The supported hydrogenation catalyst can be prepared by depositing the hydrogenation catalyst on the support by any number of methods well known to those skilled in the art of catalysis, such as spraying, soaking or physical mixing, followed by drying, calcination, and if necessary, activation through methods such as reduction.

In one embodiment, the catalyst loading of a catalyst of the present invention is from about 0.05 weight percent to about 60 weight percent based on the weight of the biopolymer. In another embodiment, the catalyst loading of a catalyst of the present invention is from about 0.5 weight percent to about 50 weight percent. In another embodiment, the catalyst loading of a catalyst of the present invention is from about 2.5 weight percent to about 30 weight percent. In another embodiment, the catalyst loading of a catalyst of the present invention is from about 0.5 weight percent to about 25 weight percent. In one embodiment, the catalyst loading of a catalyst of the present invention is about 25 weight percent. In another embodiment, the catalyst loading of a catalyst of the present invention is about 50 weight percent. In another embodiment, the catalyst loading of a catalyst of the present invention is about 60 weight percent. In one embodiment, the catalyst is loaded in a fixed bed. In another embodiment, the catalyst is loaded in a slurry wherein the process is operated continuously.

As would be understood by one skilled in the art, any solvent in which the biopolymer is soluble is contemplated by the invention. In some embodiments, the solvent is an organic solvent. Non-limiting examples of organic solvents include methanol, ethanol, isopropanol, tert-butanol, ethylene glycol, 1,4-dioxane, acetic acid, acetone, dichloromethane, N,N-dimethylformamide, N,N-dimethylacetamide, N, N'-dimethylpropyleneurea, dimethylsulfoxide, hexamethylphosphoramide, ethyl acetate, acetonitrile, hexane, hexene, octane, pentane, heptane, cyclohexane, iso-octane, toluene, benzene, dimethyl ether, diethyl ether, di-n-butyl ether, di-iso-propyl ether, 2-methyltetrahydrofuran, 1,3-dioxolane, cyclopropylmethyl ether, tert-butylmethyl ether, tetrahydropyran, glyme, diglyme, 1,4-dioxane, and tetrahydrofuran. In one embodiment, the solvent is tetrahydrofuran. In another embodiment, the solvent is methanol. In another embodiment, the solvent is ethyl acetate. In other embodiments, the solvent is water. In some embodiments, the solvent comprises a first solvent and a second solvent. In one embodiment, the first solvent is water and the second solvent is an organic solvent. In some embodiments, acid is added to the solvent. In other embodiments, base is added to the solvent. In one embodiment, the solvent is aqueous tetrahydrofuran. In another embodiment, the solvent is aqueous base.

In one embodiment, the reaction system further includes an oxide trap which reacts with a phenoxide, metal oxide, or metal hydroxide intermediate, which may be produced in the course of the reaction. Exemplary oxide traps include proton sources such as silylating agents such as silyl chlorides, including trimethylsilyl chloride, tert-butydimethylsilyl chloride, and triisopropylsilyl chloride, and hexamethyldisilazane; anhydrides; acyl chlorides; halocarbonates; proton sources such as Bronsted acids, Lewis acids, protic solvents, and water; and alkyl halides, such as alkyl chlorides, alkyl bromides and alkyl iodides.

In one embodiment, the reaction system further comprises at least one additive. Exemplary additives include, but are not limited to, oxidants, reductants, radical traps, polymerization inhibitors, persistent radicals, proton sources, hydrogen radical sources, and hydride sources. In one embodiment, the additive is selected from the group consisting of hydrogen sources such as Hantzsch ester (diethyl 1,4-dihydro-2,6-dimethyl-3,5-pyridinedicarboxylate) and other 1,4-dihydropyridines; proton sources such as water, methanol, tert-butanol, phenol, acetic acid, and thiophenol; acidic polymerization inhibitors such as sulfur dioxide, hydrogen fluoride, boron trifluoride, nitric oxide, organic acids, organic anhydrides, stannic chloride and ferric chloride; free radical inhibitors such as 4-methoxyphenol, 2,6-bis(tert-butyl)-4-methylphenol (BHT), phenothiazine, hydroquinone or pyrocatechol; persistent radicals such as TEMPO (2,2,6,6-tetramethyl-1-piperidinyloxy radical) or TEMPO derivatives including 4-hydroxy-2,2,6,6-tetramethylpiperidin-1-oxyl (OH-TEMPO), 4-methoxy-2,2,6,6-tetramethylpiperidin-1-oxyl (4-methoxy-TEMPO), 4-carboxy-2,2,6,6-tetramethylpiperidin-1-oxyl (4-carboxy-TEMPO), 4-acetoxy-2,2,6,6-tetramethylpiperidin-1-oxyl (4-OAc-TEMPO), and 4-oxo-2,2,6,6-tetramethylpiperidin-1-oxyl (TEMPONE); enones, such as benzoquinone, naphthoquinone, anthraquinone, phenanthrene quinone; catechol and derivatives such as 4-alkyl catechols; copper, copper salts, manganese, manganese salts, chromium, and chromium salts; beta-phenylnapthylamine, 2-amino-5-hydroxytoluene, alphanaphthol, quinone, n-butylpara-aminophenol, and pyrogallol.

In one embodiment, the temperature of the reaction system is less than 100° C. In one embodiment, the temperature of the reaction system is less than 90° C. In one embodiment, the temperature of the reaction system is less than 80° C. In one embodiment, the temperature of the reaction system is less than 70° C. In one embodiment, the temperature of the reaction system is less than 60° C. In one embodiment, the temperature of the reaction system is less than 50° C. In one embodiment, the temperature of the reaction system is less than 40° C. In one embodiment, the temperature of the reaction system is less than 30° C. In one embodiment, the temperature of the reaction system is less than 25° C. In some embodiments, the temperature of the system is maintained at room temperature, between about 20° C. and about 25° C. In one embodiment, the temperature of the system is held constant. In another embodiment, the temperature of the system is increased over time. In another embodiment, the temperature of the system is decreased over time.

In some embodiments, pressure is applied to the reaction system. The pressure can be any pressure that is sufficient to promote the depolymerization of a biopolymer into one or more monomers, as would be understood by a skilled artisan. In some embodiments, a gas is added to the system to increase the pressure. Non-limiting examples of a gas include nitrogen, argon, and hydrogen. In one embodiment, the pressure of the system at room temperature is between 0.1 bar and 100 bar. In one embodiment, the pressure of the system is held constant. In another embodiment, the pressure of the system is increased over time. In another embodiment, the pressure of the system is decreased over time.

The process of depolymerizing the biopolymer into a monomer is carried out over a period of time known as the reaction time. As used herein, the term "reaction time" refers to an amount of time effective for the depolymerization of at least some biopolymers into monomers, mixtures of monomers, and/or oligomers. In one embodiment, the reaction time is between 0.1 hours to 10 hours. In another embodiment, the reaction time is between 0.5 hours to 20 hours. In another embodiment, the reaction time is between 1 hour to 12 hours. In one embodiment, the reaction time is at least 40 minutes. In another embodiment, the reaction time is at least 60 minutes. In a certain embodiment, the reaction time is at least 2 hours. In another embodiment, the reaction time is at least 3 hours. In another embodiment, the reaction time is at least 4 hours. In another embodiment, the reaction time is at least 6 hours. In another embodiment, the reaction time is at least 8 hours. In another embodiment, the reaction time is at least 10 hours. In another embodiment, the reaction time is at least 12 hours. In another embodiment, the reaction time is at least 14 hours. In another embodiment, the reaction time is at least 18 hours. In another embodiment, the reaction time is at least 20 hours.

The systems and methods of the present invention may be carried out within a reaction vessel. A reaction vessel of any size, shape, or internal volume may be used within the systems and methods of the present invention. In some embodiments, the reaction vessel is a reactor. In one embodiment, the reaction vessel is a continuous stirred tank reactor (CSTR). In another embodiment, the reaction vessel is a continuous reactor, for example, a plug flow reactor (PFR). In yet another embodiment, the reaction vessel is a hydrogenator or other type of pressurized vessel. In certain embodiments, the reaction vessel comprises at least one inlet passage and at least one outlet passage. The at least one inlet passage and the at least one outlet passage permit reaction components to enter and/or exit the reaction vessel. In one embodiment, the reaction vessel has a fixed volume. In certain embodiments, the reaction vessel is suitable for performing the reactions described hereinthroughout. Reaction components may be added to a reaction vessel such that the depolymerization and/or extraction may be performed within the reaction vessel. Non-limiting examples of reaction components include a reaction substrate, such as a biopolymer source, a reaction product, such as a monomer, a solvent, and a catalyst. In one embodiment, a biopolymer, a solvent, and at least one catalyst are added to a reaction vessel, and the depolymerization reaction is performed on the reaction components within the reaction vessel.

In one embodiment, the reaction system comprises an inert atmosphere such as $N_2$ or Ar gas. In one embodiment, the reaction system is open to ambient atmosphere. In one embodiment, the reaction system comprises 02 gas.

Monomers

In one embodiment, method 100 comprises the step of isolating at least one monomer from the reaction system. Any aromatic compound and/or oligomer that can be produced by depolymerizing a biopolymer is contemplated by the present invention, as would be understood by one skilled in the art. In a preferred embodiment, the monomer is an aromatic monomer. In some embodiments, the monomer provided by the methods of the present invention include aromatic lignin compounds such as phenols, guaicols, syringols, eugenol, coniferols, and catechols. In one embodiment, the monomer is an allyl-substituted aromatic compound. In one embodiment, the monomer is a phenylpropanoid. In one embodiment, the monomer is an allyl phenylpropanoid. In one embodiment, the monomer is an allyl-substituted syringyl, guaiacyl, paracoumaryl (p-hydroxyphenyl), or 3-hydroxyphenyl compound. In one embodiment, the monomer is a 1-propenyl-substituted syringyl, guaiacyl, 3-hydroxylphenyl, or paracoumaryl (p-hydroxyphenyl) compound. In one embodiment, the monomer is 4-allylsyringol, 4-allylguaiacol, 3-allylphenol, or 4-allylphenol.

In one embodiment, the monomer is a hydroxycinnamic alcohol, in which the aromatic ring may have additional substituents.

In one embodiment, the monomer is a 1-propenyl-substituted aromatic compound. In one embodiment, the monomer is a 1-propenyl phenylpropanoid. In one embodiment, the monomer is an 1-propenyl-substituted syringyl, guaiacyl, or paracoumaryl (p-hydroxyphenyl) compound In one embodiment, the monomer is 4-(1-propenyl)-syringol, 4-(1-propenyl)-guaiacol, 3-(1-propenyl)-phenol, or 4-(1-propenyl)-phenol.

In one embodiment, the monomer is a propyl-substituted aromatic compound. In one embodiment, the monomer is a 1-propyl phenylpropanoid. In one embodiment, the monomer is an 1-propyl-substituted syringyl, guaiacyl, phenol, or paracoumaryl (p-hydroxyphenyl) compound In one embodiment, the monomer is 4-propylsyringol, 4-propylguaiacol, 3-propylphenol, or 4-propylphenol.

In one embodiment, any or all phenols of any monomer disclosed herein may be substituted with hydrogen, methyl groups, or trimethylsilyl groups, depending on biopolymer structure and reaction conditions, as would be understood by one of ordinary skill in the art.

The monomers can be isolated from the system using any method known in the art. In one such method, the monomers can be separated from the catalyst by filtration, and can then be separated from solvent by rotary evaporation. If necessary, the monomers can be further purified by any method known in the art, such as column chromatography, crystallization, precipitation, distillation, liquid-liquid extraction, or membrane separations. In a preferred embodiment, the monomers are purified using column chromatography.

In one aspect, the monomers of the present invention can be submitted to subsequent chemical modifications, as understood by one skilled in the art. These modifications include a variety of derivatizing chemical reactions, such as reduction, oxidation, polymerization, addition/substitution, and the like.

Compounds described herein may possess one or more stereocenters, and each stereocenter may exist independently in either the R or S configuration. In one embodiment, compounds described herein are present in optically active, racemic, or meso diastereomeric forms. It is to be understood that the compounds described herein encompass racemic, optically-active, regioisomeric and stereoisomeric forms, or combinations thereof that possess the catalytically useful properties described herein. Preparation of optically active forms is achieved in any suitable manner, including by way of non-limiting example, by resolution of the racemic form with recrystallization techniques, synthesis from optically-active starting materials, chiral synthesis, or chromatographic separation using a chiral stationary phase. In one embodiment, a mixture of one or more isomer is utilized as the compound described herein. In another embodiment, compounds described herein contain one or more chiral centers. These compounds are prepared by any means, including stereoselective synthesis, enantioselective synthesis and/or separation of a mixture of enantiomers and/or diastereomers. Resolution of compounds and isomers thereof is achieved by any means including, by way of non-limiting example, chemical processes, enzymatic processes, fractional crystallization, distillation, and chromatography.

The compounds described herein, and other related compounds having different substituents are synthesized using techniques and materials described, for example, in Fieser & Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), Larock's Comprehensive Organic Transformations (VCH Publishers Inc., 1989), March, Advanced Organic Chemistry $4^{th}$ Ed., (Wiley 1992); Carey & Sundberg, Advanced Organic Chemistry 4th Ed., Vols. A and B (Plenum 2000, 2001), and Green & Wuts, Protective Groups in Organic Synthesis 3rd Ed., (Wiley 1999) (all of which are incorporated by reference for such disclosure). General methods for the preparation of compound described herein are modified by the use of appropriate reagents and conditions, for the introduction of the various moieties found in the formula as provided herein.

Electrochemical Cells

In one embodiment, the electron source is the cathode of an electrochemical cell. In one aspect, the present invention relates to a method of depolymerizing a biomass, the method comprising the step of reducing the biomass in an electrochemical cell comprising at least one catalyst, at least one solvent, at least one electrolyte, an anode, and a cathode.

In one embodiment, the electrochemical cell is a divided cell. In one embodiment, the divided cell comprises two half cells, such as one anodic cell (anodic chamber) and one cathodic cell (cathodic chamber). In one embodiment, the two half cells are conductively joined by a salt bridge. In one embodiment, the salt bridge allows for the transmission of charge, but not physical material, between the two half cells.

In one embodiment, the salt bridge comprises at least one salt. Any salt known to those of skill in the art may be utilized in the salt bridge. The salt bridge may comprise, for example, potassium salts such as $KNO_3$ or sodium salts such NaCl, or some other electrolyte such as those discussed herein. In one embodiment, the electrochemical cell is an undivided cell.

In one embodiment, the cathode or the anode comprises graphite, reticulated vitreous carbon (RVC), platinum, nickel, magnesium, copper, or combinations thereof.

In one embodiment, the cathode or the anode comprises zinc, aluminum, iron, platinum, graphite, RVC, or combinations thereof. In one embodiment, the cathode or the anode is a sacrificial electrode, in which at least one component of the electrode is consumed in the reaction. In one embodiment, zinc, aluminum, or iron in the cathode or the anode is consumed over the course of the reaction.

The solvent in the electrochemical cell may be any solvent known to those of skill in the art. Exemplary solvents include, but are not limited to, tetrahydrofuran, acetonitrile, water, dimethylformamide, dimethylacetamide, dimethyl sulfoxide, 1,4-dioxane, ionic liquids, and combinations thereof.

The electrolyte comprises at least one cation and at least one anion. Exemplary cations include, but are not limited to, tetrabutylammonium salts, tetraethylammonium salts, ammonium salts, lithium salts, sodium salts, and potassium salts. Exemplary cations include, but are not limited to, hexafluorophosphate, tetrafluoroborate, perchlorate, bromide, and chloride. Exemplary electrolytes include, but are not limited to, $Bu_4NPF_6$, $Bu_4NBF_4$, $Bu_4NClO_4$, $Bu_4NBr$, $Bu_4NCl$, $Et_4NPF_6$, $Et_4NBF_4$, $Et_4NClO_4$, $Et_4NBr$, $Et_4NCl$, $H_4NPF_6$, $H_4NBF_4$, $H_4NClO_4$, $H_4NBr$, $H_4NCl$, $LiPF_6$, $LiBF_4$, $LiClO_4$, LiBr, Li Cl, $NaPF_6$, $NaBF_4$, $NaClO_4$, NaBr, NaCl, $KPF_6$, $KBF_4$, $KClO_4$, KBr, and KCl.

In one embodiment, the electrochemical cell further comprises a reductant. Exemplary additional reductants include $Et_3N$, $iPr_2NH$, $iPr_2NEt$, $H_2$, or combinations thereof.

In one embodiment, the electrochemical cell further comprises a halide abstractor. In one embodiment, the electrochemical cell further comprises a chelator. Exemplary halide extractors and/or chelators include, but are not limited to, thioureas, porphyrins, and pyridine/pyridinium salts.

In one embodiment, a voltage is supplied to the electrochemical cell. In one embodiment, the voltage is greater than 0 V. In one embodiment, the voltage is greater than 0.5 V. In one embodiment, the voltage is greater than 1.0 V. In one embodiment, the voltage is greater than 1.5 V. In one embodiment, the voltage is greater than 2.0 V. In one embodiment, the voltage is greater than 2.5 V. In one embodiment, the voltage is greater than 3.0 V. In one embodiment, the voltage is greater than 3.5 V. In one embodiment, the voltage is greater than 4.0 V. In one embodiment, the voltage is greater than 4.5 V. In one embodiment, the voltage is greater than 5.0 V. In one embodiment, the voltage is greater than 5.5 V. In one embodiment, the voltage is greater than 6.0 V. In one embodiment, the voltage is less than 6.5 V. In one embodiment, the voltage is about 4.4 V.

A person skilled in the art recognizes, or is able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

Photochemical Methods

In one aspect, the present invention relates to a method of depolymerizing a biopolymer, the method comprising the steps of: providing a biopolymer; adding a photoredox-active functional group to the biopolymer to form a modified biopolymer; and irradiating the modified biopolymer with light in the presence of a reaction mixture, said mixture comprising a photoredox catalyst.

In one embodiment, the biopolymer may be any biopolymer discussed herein. In one embodiment, the biopolymer is a lignin. In one embodiment, the biopolymer is a lignin derivative. In one embodiment, the biopolymer is a lignin model compound designed to have a lignin-like scaffold. The biopolymer is first subjected to a modification that renders the material more susceptible to photoredox depolymerization. In one embodiment, the biopolymer is modified by the addition of at least one oxalate group. In one embodiment, the biopolymer is modified by treatment of the biopolymer with oxalyl chloride. In one embodiment, the biopolymer is modified by treatment of the biopolymer with acyl chloride, followed by treatment with oxalyl chloride. Acyl chloride could be replaced with other alcohol protecting groups, such as MeI, TMSCl, benzyl chloride, tetrahydro-2-pyranol, etc. Oxalyl chloride may be replaced by chloro-oxo-acetic acid or 1,4-dioxane-2,3,5,6-tetrone.

The term "photoredox catalyst" refers to a catalyst that, when exposed to light, is able to cause oxidation or reduction of another compound via single-electron transfer events. In some embodiments, the photoredox catalyst will also be oxidized or reduced as a result of this process (i.e., when the other compound is oxidized or reduced, the photoredox catalyst will be reduced or oxidized, respectively). In certain embodiments, the photoredox catalyst, when exposed to light, is capable of triggering or initiating a radical depolymerization, or a radical degradation, of the biopolymer by causing radicals to form on the biopolymer. There is no particular limit on the amount of photoredox polymer used, with respect to the mass of biopolymer. In one embodiment, a catalytic amount (sub-equivalent) of photoredox polymer is used. In one embodiment, the photoredox catalyst has an oxidation potential greater than or equal to about 1.28 V relative to the saturated calomel electrode (SCE).

In one embodiment, the photoredox catalyst is an organic photoredox catalyst. Exemplary organic photoredox catalysts useful in the methods described herein include 1,4-dicyanobenzene, 1,4-dicyanonaphthalene, 9,10-dicyanoanthracene, benzophenone, Michler's Ketone, fluorenone, xanthone, thioxanthone, anthraquinone, 2,3-dichloro-5,6-dicyano-p-benzoquinone, p-chloroanil (2,3,5,6-tetrachlorobenzoquinone), triphenylpyrylium salts, triphenylthiopyrylium salts, 2,4,6-tris-(4-methoxyphenyl)pyrylium salts, 2,4,6-tris-(4-methoxyphenyl)thiopyrylium salts, N-methylquinolinium, 3-cyano-1-methylquinolinium, fluorescein, eosin Y, rose Bengal, Rhodamine B, Rhodamine 6G, 10-methylacridinium salts, 9-phenyl-10-methylacridinium salts, 9-mesityl-10-methylacridinium salts, 9-mesityl-2,7-dimethyl-10-phenylacridinium salts, 9-mesityl-2,7-dibromo-10-phenylacridinium salts, acridine orange, acriflavin, proflavin, 10-phenylphenothiazine, methylene blue, 2,7-dimethyldiazapyrenium salts, perylene, perylene diimide, N,N'-bis(2,6-diisopropylphenyl)perylene diimide, N,N'-bis(2,5-di-tert-butylphenyl)perylene diimide, N-(4-(10H-phenothiazin-10-yl)phenyl)acrylamide, 2,4,5,6-tetrakis (carbazol-9-yl)-1,3-dicyanobenzene, 2,3,5,6-tetrakis (carbazol-9-yl)-1,4-dicyanobenzene, 4,5-bis(carbazol-9-yl)-1,2-dicyanobenzene, 2,3,5,6-tetrakis(3,6-diphenylcarbazol-9-yl)-1,4-dicyanobenzene, 10-(4-(4-(10H-Phenoxazin-10-yl)phenylsulfonyl)phenyl)-10H-phenoxazine, 10,10'-(4,4'-Sulfonylbis(4,1-phenylene))bis(9,9-dimethyl-9,10-dihydroacridine), 10,10'-(sulfonylbis(4,1-phenylene))bis(9,9-dimethyl-9,10-dihydroacridine), riboflavin, 4CzIPN (2,4,5,6-tetra(9H-carbazol-9-yl)isophthalonitrile), 3DPAFIPN (2,4,6-tris(diphenylamino)-5-fluoroisophthalonitrile), 5CzBN, 3DPA2FBN (2,4,6-tris(diphenylamino)-3,5-difluorobenzonitrile), 3CzClIPN (2,4,6-tri(9H-carbazol-9-yl)-5-chloroisophthalonitrile), and 4MeOCzIPN.

In one embodiment, the photoredox catalyst comprises a transition metal complex. In one embodiment, the photoredox catalyst is an Ir(III) or a Ru(II) complex. Exemplary transition metal complexes include, but are not limited to, Ir[dF(CF$_3$)ppy]$_2$(dtbbpy)PF$_6$, Ir[dF(Me)ppy]$_2$(dtbbpy)PF$_6$, Ir(dFFppy)$_2$(dtbbpy)PF$_6$, Ir[dFFppy]2-(4,4'-dCF3bpy)PF$_6$, 4,4'-Bis(trifluoromethyl)-2,2'-bipyridinebis[3,5-difluoro-2-(5-trifluoromethyl-2-pyridinyl)phenyl] iridium(III) hexafluorophosphate, Tris(2-phenylpyridine)iridium, Ir[FCF$_3$(CF$_3$)ppy]$_2$(dtbbpy)PF$_6$, [Ir(dFOMeppy)$_2$-(5,5'-dCF3bpy)]PF$_6$, Ir(p-CF$_3$-ppy)$_3$, Tris(2-phenylpyridine) iridium, [Ir(dtbbpy)(ppy)$_2$]PF$_6$, (Ir[Me(Me)ppy]$_2$(dtbpy)) PF$_6$, Ir(p-F-ppy)$_3$, [Ir{dFCF$_3$ppy}$_2$(bpy)]PF$_6$, [5,5'-Bis (trifluoromethyl)-2,2'-bipyridine-κN,κN]bis[3,5-difluoro-2-[5-(trifluoromethyl)-2-pyridinyl-κN]phenyl] iridium hexafluorophosphate, Bis[2-(2,4-difluorophenyl)-5-trifluoromethylpyridine] [1,10-phenanthroline] iridium hexafluorophosphate, [4,4'-Di-t-butyl-2,2'-bipyridine][bis[5-(t-butyl)-244-(t-butyl)-2-pyridinyl-kN]phenyl-kC]iridium(III) hexafluorophosphate, (2,2-Bipyridine)bis[2-(2,4-difluorophenyl)pyridine]iridium(III) Hexafluorophosphate, [2,2'-Bis (4-tert-butylpyridine)]bis[2-(2,4-difluorophenyl)pyridine] iridium(III) hexafluorophosphate, [2,2'-Bis(4-tert-butylpyridine)]bis[2-(4-fluorophenyl)pyridine]iridium(III) hexafluorophosphate, (2,2'-Bipyridine)bis[2-pyridinyl-kN) phenyl-kC]iridium(III) hexafluorophosphate, di-μ-chlorotetrakis[3,5-difluoro-2-(2-pyridinyl-κN)phenyl-κC]diiridium, Di-μ-chlorotetrakis[5-fluoro-2-(5-methyl-2-pyridinyl-κN) phenyl-κC]diiridium, Di-μ-chlorotetrakis[3,5-difluoro-2-(5-methyl-2-pyridinyl-κN)phenyl-κC]diiridium, Di-μ-chlorotetrakis[3,5-difluoro-2-(5-fluoro-2-pyridinyl-κN)phenyl-κC]diiridium, Di-μ-chlorotetrakis[3,5-difluoro-2-[5-trifluoromethyl-2-pyridinyl-kN)phenyl-kC]diiridium(III), (2,2'-bipyridyl) bis[2-(4-tert-butylphenyl) pyridine] iridium (III) hexafluorophosphate, 4,4'-Bis(trifluoromethyl)-2,2'-bipyridinebis[3,5-difluoro-2-[5-methyl-2-pyridinyl)phenyl] iridium(III) hexafluorophosphate, Tris[2-(4,6-difluorophenyl)pyridinato-C2,N]iridium(III), Dichlorotetrakis(2-(2-pyridinyl)phenyl)diiridium(III), Bis[2-(4,6-difluorophenyl) pyridinato-C2,N](picolinato)iridium(III), Ir(mppy)$_3$, (Ir[Me (Me)ppy]$_2$(dtbpy))PF$_6$, Ir[dF(t-Bu)-ppy]$_3$, [Ir{dFCF$_3$ppy}$_2$ (bpy)]PF$_6$, Ir[dFFppy]2-(4,4'-dCF3bpy)PF$_6$, Ir(dFFppy)$_2$ (dtbbpy)PF$_6$, Ir(p-CF$_3$-ppy)$_3$, [Ru(dmbpy)$_3$](PF$_6$)$_2$, [Ru (dtbbpy)$_3$](PF$_6$)$_2$, Ru(p-CF$_3$-bpy)$_3$ (BF$_4$)$_2$, Tris(2,2'-bipyridyl)dichlororuthenium(II) hexahydrate, bis(2,2'-bipyridine)-(5-aminophenanthroline)ruthenium bis (hexafluorophosphate), tris(bipyridine)ruthenium(II) chloride, tris(bipyridine)ruthenium(II) hexafluorophosphate, tris-(bipyrazine)ruthenium(II) hexafluorophosphate, tris-(phenanthroline)ruthenium(II) chloride, tris-(bipyrimidine) ruthenium(II) chloride, bis-(2-(2',4'-difluorophenyl)-5-trifluoromethylpyridine)(di-tert-butylbipyridine)iridium(III)

hexafluorophosphate, and bis(2,9-di(para-anisyl)-1,10-phenanthroline)copper(I) chloride.

In one embodiment, the reaction mixture comprises a base. In one embodiment, the base may serve to deprotonate the oxalic acid, or may serve to facilitate the photoredox reaction. There is no particular limit on the identity of the base. Exemplary bases include inorganic bases and organic bases. Exemplary inorganic bases include, but are not limited to, hydroxides, alkoxides, carbonates, bicarbonates, acetates, citrates, tartrates (such as Rochelle's salt), fluorides, phosphates (mono-, di-, and tribasic), sulfates (mono- and dibasic), nitrates, and pivalates of alkali or alkaline earth metals; ammonium hydroxide. Exemplary organic bases include, but are not limited to, triethylamine, diethylisopropyl amine, diisopropylethylamine, collidine, pyridine, trimethylamine, tributylamine, N-methylmorpholine, 1-alkylimidazole and 1,8-diazabicyclo[5.4.0]undec-7-ene (DBU), 4-(N,N-dimethylamino)pyridine, 1-alkylimidazole and the like. In one embodiment, a combination of bases are used. In one embodiment, the base is $Na_2HPO_4$. In one embodiment, the base is NaI. In one embodiment, the base is CsF. In one embodiment, the base is $Na_2CO_3$. In one embodiment, the base is $K_2HPO_4$. In one embodiment, the base is $K_3PO_4$. In one embodiment, the base is KOH. In one embodiment, the base is NaI. In one embodiment, the base is $NaHCO_3$. In one embodiment, the base is $Cs_2CO_3$. In one embodiment, the base is KF. In one embodiment, the base is $CsHCO_3$. In one embodiment, the base is $Cs_2CO_3$. In one embodiment, the base is CsOAc. In one embodiment, the base is $Na_3PO_4$. In one embodiment, the base is $NH_4PF_6$.

In one embodiment, the reaction mixture further comprises solvent. In one embodiment, the solvent comprises any solvent discussed elsewhere herein. In some embodiments, the solvent is an organic solvent. Non-limiting examples of organic solvents include methanol, ethanol, isopropanol, tert-butanol, ethylene glycol, 1,4-dioxane, acetic acid, acetone, dichloromethane, N,N-dimethylformamide, N,N-dimethylacetamide, N, N'-dimethylpropyleneurea, dimethylsulfoxide, hexamethylphosphoramide, ethyl acetate, acetonitrile, hexane, hexene, octane, pentane, heptane, cyclohexane, iso-octane, toluene, benzene, dimethyl ether, diethyl ether, di-n-butyl ether, di-iso-propyl ether, 2-methyltetrahydrofuran, 1,3-dioxolane, cyclopropylmethyl ether, tert-butylmethyl ether, tetrahydropyran, glyme, diglyme, 1,4-dioxane, and tetrahydrofuran. In one embodiment, the solvent comprises dimethylsulfoxide (DMSO). In one embodiment, the solvent comprises cyclopropylmethyl ether (CPME), tetrahydropyran (THP), 1,4-dioxane, or tetrahydrofuran (THF). In one embodiment, the solvent comprises N,N-dimethylacetamide or N,N-dimethylformamide.

In one embodiment, the reaction mixture further comprises a $CO_2$ scavenger. In one embodiment, a $CO_2$ scavenger may facilitate radical decomposition of an oxaylate group. Exemplary $CO_2$ scavengers include, but are not limited to, molecular sieves, silica gel, quicklime (CaO), serpentinite, olivine, activated carbon, magnesium silicate hydroxide, metal-organic frameworks, covalent organic frameworks, and zeolites.

In one embodiment, the step of irradiating the modified biopolymer with light in the presence of a reaction mixture comprises the step of irradiating the reaction mixture with light corresponding to the wavelength of light absorbed by the photoredox catalyst. In one embodiment, the wavelength and intensity of light is dependent on the selection of photoredox catalyst. In one embodiment, the light comprises UV light. In one embodiment, the light comprises visible light. In one embodiment, the light comprises blue light. In one embodiment, the light comprises green light. In one embodiment, the light has a wavelength between 200 nm and 400 nm. In one embodiment, the light has a wavelength between 380 nm and 450 nm. In another embodiment, the light has a wavelength between 400 nm and 700 nm. In another embodiment, the light has a wavelength between 450 nm and 495 nm. In another embodiment, the light has a wavelength between 495 nm and 570 nm. In another embodiment, the light has a wavelength between 570 nm and 590 nm. In another embodiment, the light has a wavelength between 590 nm and 620 nm. In another embodiment, the light has a wavelength between 620 nm and 750 nm.

In one embodiment, the step of irradiating the modified biopolymer with light in the presence of a reaction mixture is performed at room temperature. In one embodiment, the step is performed at a temperature greater than 20° C. In one embodiment, the step is performed at a temperature between about 20° C. and about 100° C. In one embodiment, the step is performed at a temperature of about 100° C. In one embodiment, the step is performed at a temperature greater than about 100° C. In some embodiments, the step is performed at a temperature lower than 20° C.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the systems practice the claimed methods of the present invention. The following working examples therefore, specifically point out the preferred embodiments of the present invention, and are not to be construed as limiting in any way the remainder of the disclosure.

Example 1: Ti-Catalyzed Reductive Valorization of Lignin Model Compounds

Figure 2A:
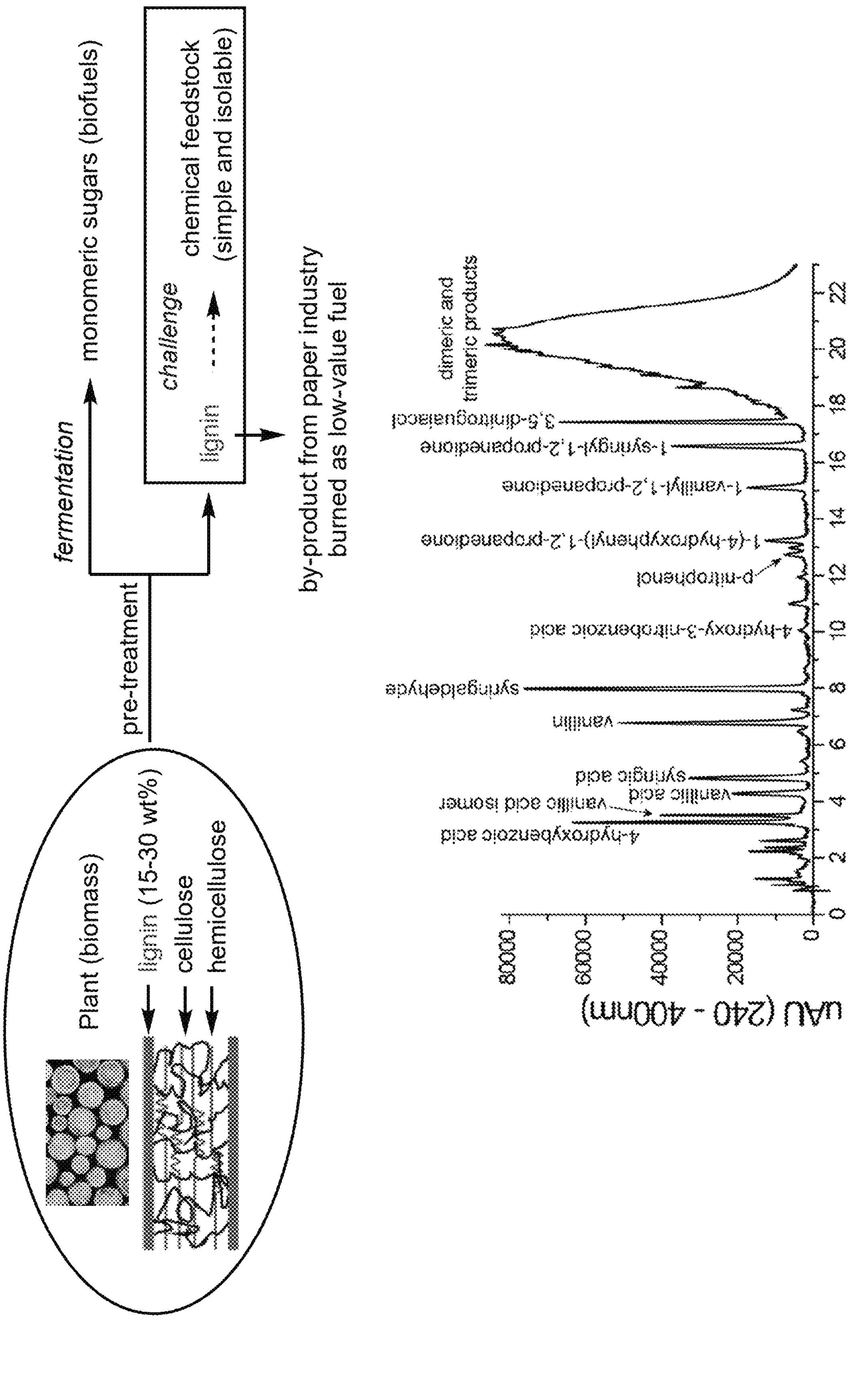
FIG. 2A and FIG. 2B depict the valorization of lignin biomass.
Figure 2B:
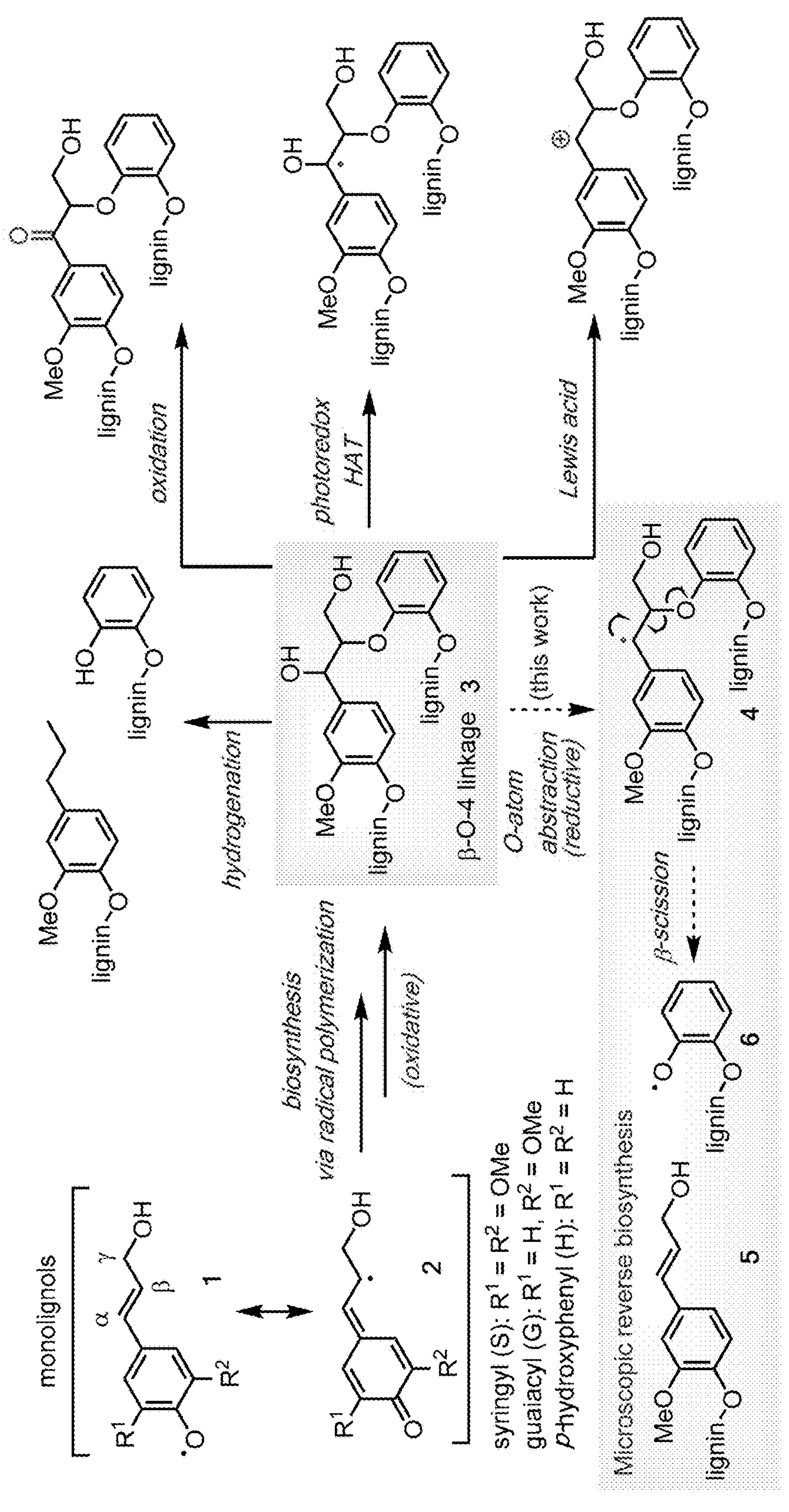
Figure 3:
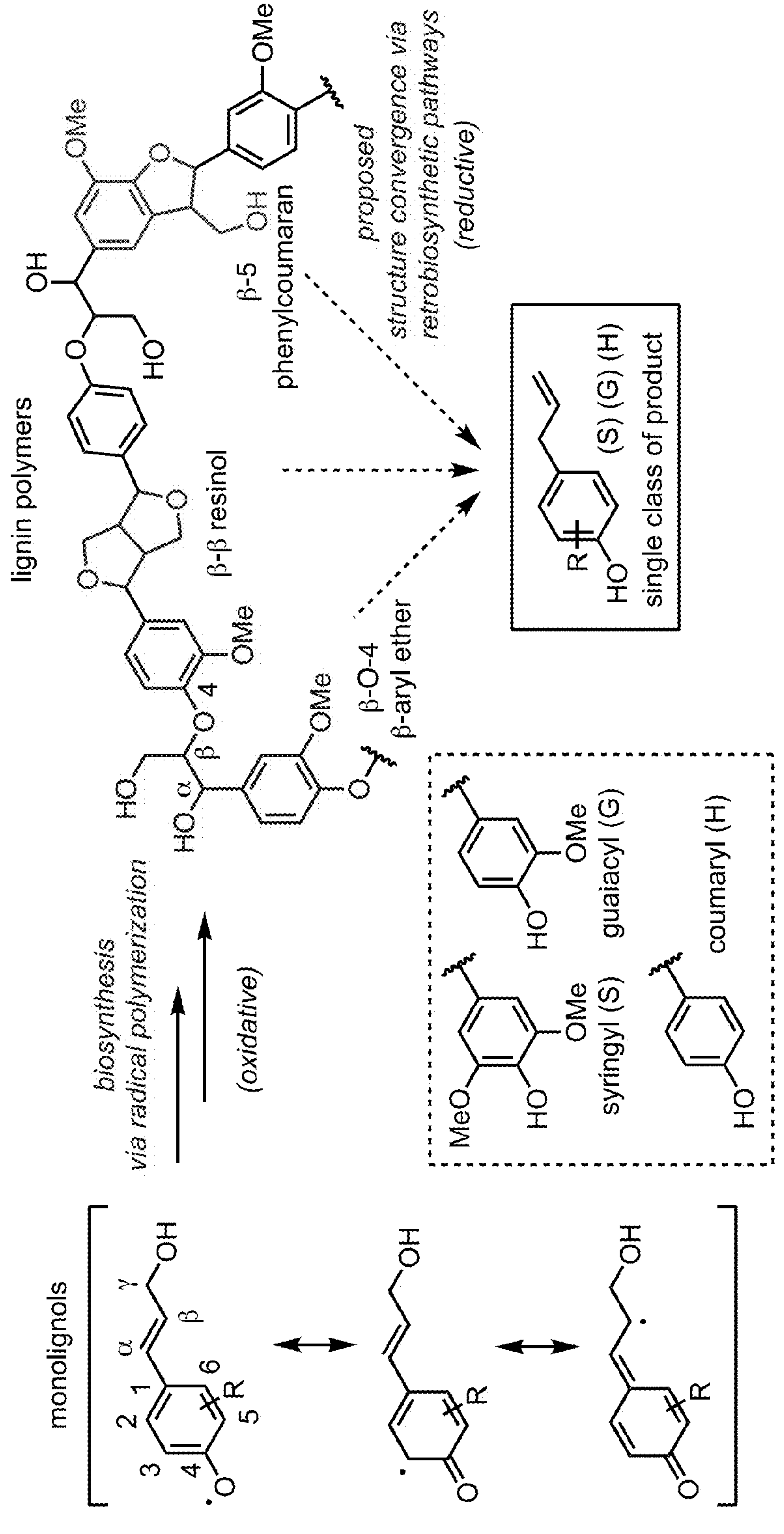
FIG. 3 is a scheme of the biosynthesis of lignin and the structure convergence of lignin to one class of arene product.

Current catalytic methods to depolymerize lignin (FIG. 2A) afford a mixture of different products, which has prevented the commercialization of these methods (FIG. 2B). This intrinsic limitation stems from strategies that only target the β-O-4 linkage. In contrast, the lignin structure features non-regular patterns of moieties, including β-β, β-5, and 5-5 linkages, in addition to the β-O-4 linkage (FIG. 3).

Lignin is naturally synthesized from one class of compounds, p-hydroxycinnamic alcohol derivatives (monolignols), which are biosynthetically derived from phenylalanine and tyrosine (Vanholme, et al., Plant Physiology 2010, 153, 895-905). The biosynthesis of lignin involves polymerization of three monomers, sinapyl alcohol, coniferyl alcohol, and p-coumaryl alcohol, to afford syringyl (S), guaiacyl (G), and p-hydroxyphenyl (H) units, respectively (Matsushita, et al., Royal Society Open Science 2019, 6, 190445; Tobimatsu and Schuetz, Curr. Opin. Biotechnol. 2019, 56, 75-81). The monomers undergo free radical coupling to form C—O and C—C linkages, catalyzed by peroxidase and laccase enzymes (FIG. 3). The resulting dimer is oxidized to phenolic radical, which further couples with another monomer radical, eventually forming the polymer. The seemingly different motifs, β-O-4, β-β, β-5, and 5-5 linkages, are simply derived from coupling of the different resonance structures of the same radical intermediate. Due to the preference of coupling at their β positions and the enzyme control, the β-O-4 linkage represents the predominant structures in lignin. The biosynthesis of lignin inspired the development of a reverse-biosynthetic depolymerization method, in which radical intermediates on the biosynthetic pathway are formed from deoxygenation. The cleavage of the polymer is thermodynamically driven by addition of reductants. This process can converge the diverse structures of lignin to a single class of products.

Figure 4:
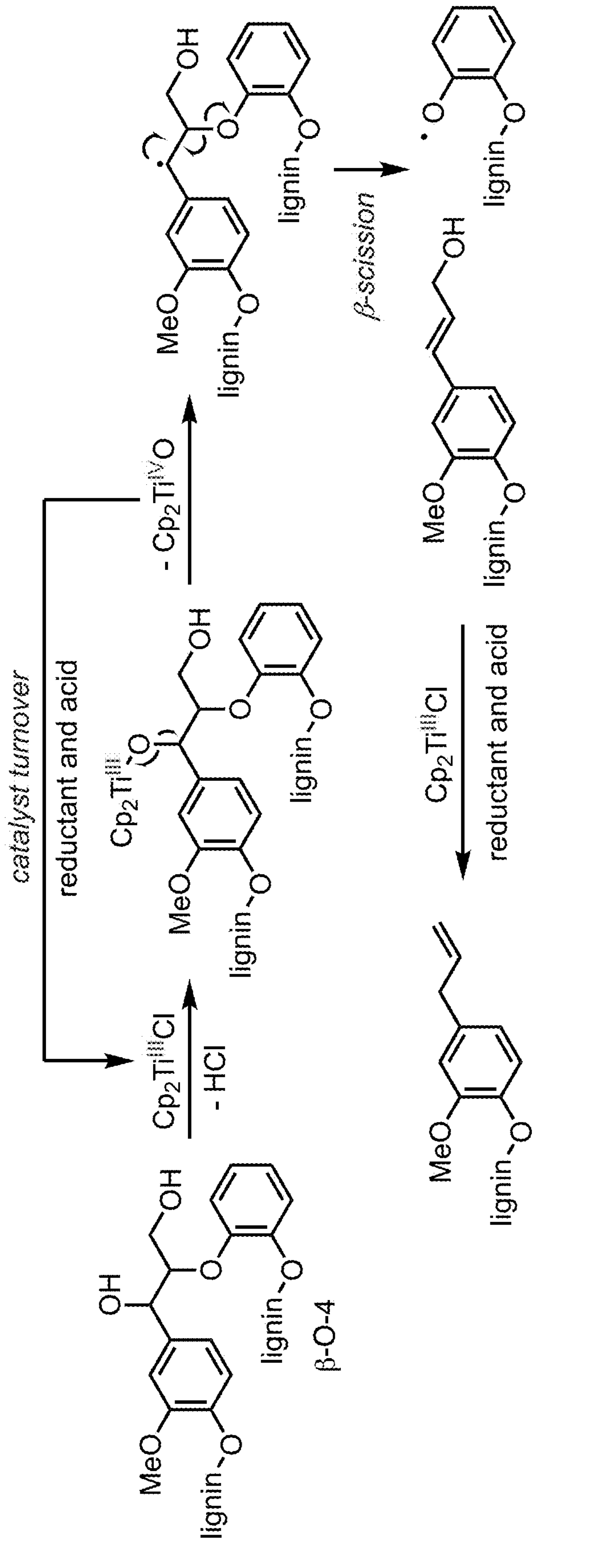
FIG. 4 is a scheme of the mechanistic rationale for Ti-catalyzed cleavage of the β-O-4 linkage.

Titanium complexes have modular structures and exhibit rich redox activities (Qian, et al., Chem. Rev. 2003, 103, 2633-2690; Beaumier, et al. Nature Reviews Chemistry 2019, 3, 15-34; McCallum, et al., The Journal of Organic Chemistry 2019, 84, 14369-14380). For example, $Cp_2Ti(III)Cl$ can extract oxygen from benzylic or allylic alcohols to afford radicals (Dieguez, et al., J. Am. Chem. Soc. 2010, 132, 254-259). This reaction starts from the coordination of $Cp_2Ti(III)Cl$ to the benzylic hydroxyl group, followed by the homolytic bond cleavage to afford a benzylic radical and Ti(IV)O. This step is expected to be driven by formation of the strong Ti═O bond, from which $Cp_2Ti(III)Cl$ can be regenerated with reductants and acids. The weak benzylic C—O bond of the β-O-4 linkage directs Ti to extract the β-C—O bond, leaving a benzylic radical (FIG. 4). This intermediate undergoes β-scission to cleave the β-C—O bond. The resulting conjugated alcohol derivative undergoes further O-extraction to afford allyl benzene. The clean formation of allyl arene derivatives suggests that this reverse-biosynthetic pathway represents a promising approach for lignin valorization to valuable chemical products. Allyl benzenes can easily isomerize to 1-arylpropenes, which are common building blocks for polystyrene. Moreover, phenylproanoids have found applications in medicinal and cosmetic utilities as anti-oxidants, anti-inflammatory, anti-cancer, anti-bacterial drugs, UV screens, and other purposes. Currently, the major production of these compounds depends on inefficient extraction from plants.

Figure 5:
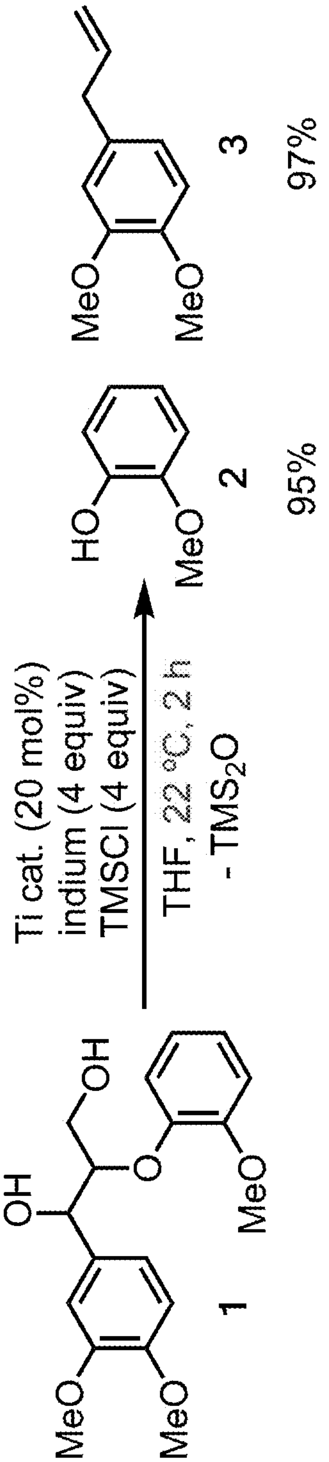
FIG. 5 is a reaction diagram for the Ti-catalyzed reductive cleavage of a model substrate of the β-O-4 linkage of lignin.
Figure 6:
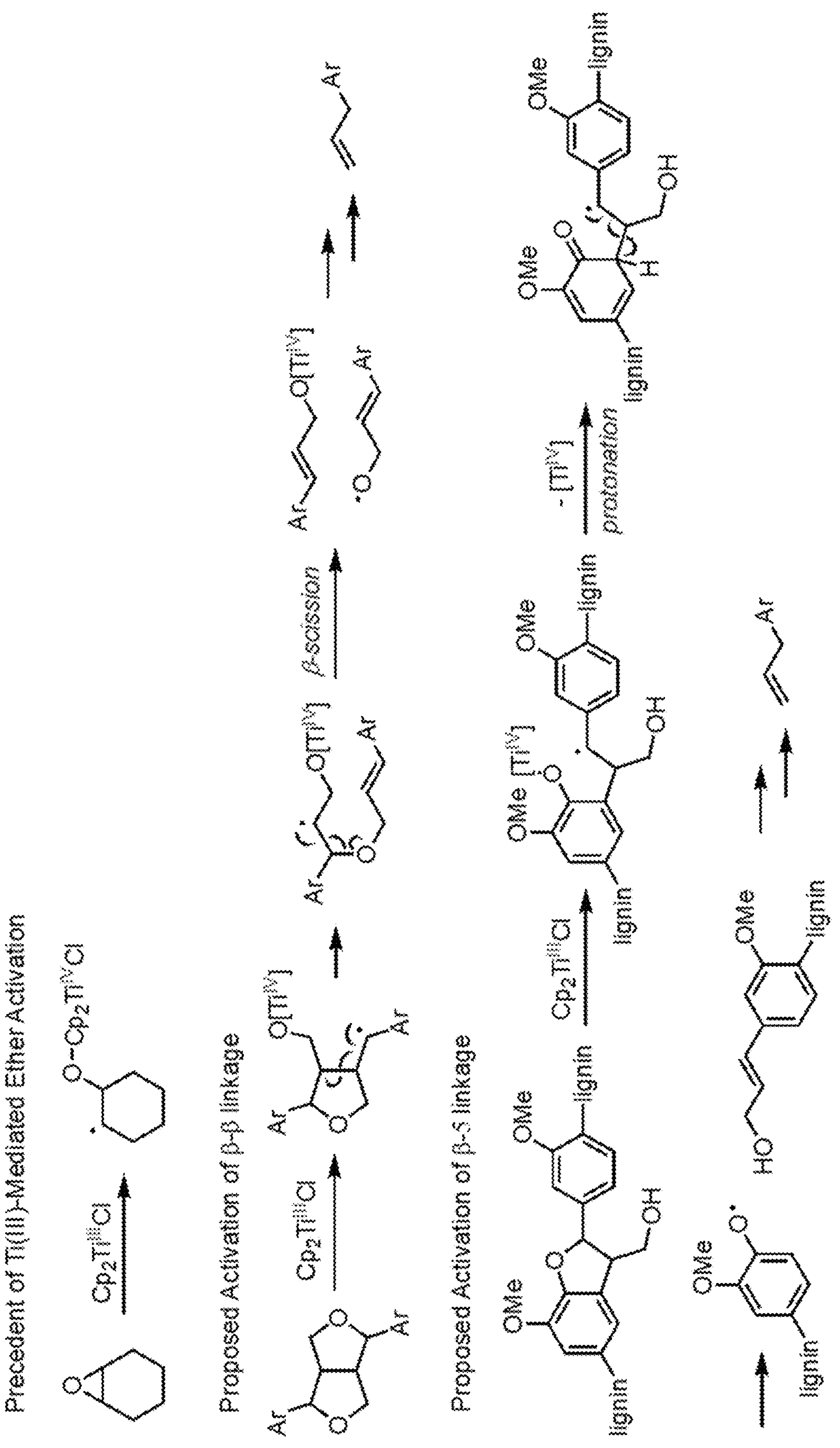
FIG. 6 is a scheme demonstrating the mechanistic rationale for Ti-catalyzed cleavage of the β-β and β-5 linkages.
Figure 7:
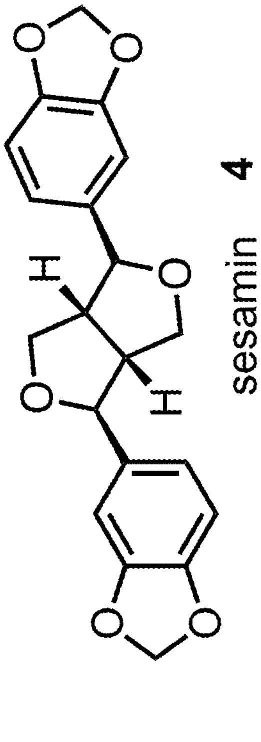
FIG. 7 depicts model compounds for lignin β-β and β-5 linkages.
Figure 7:
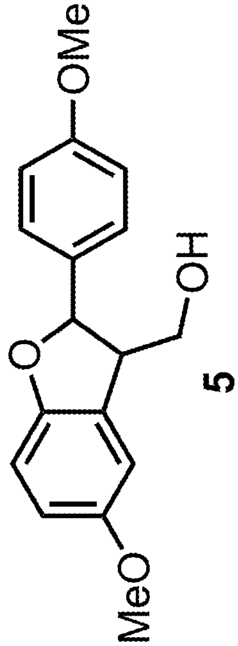
Figure 15:
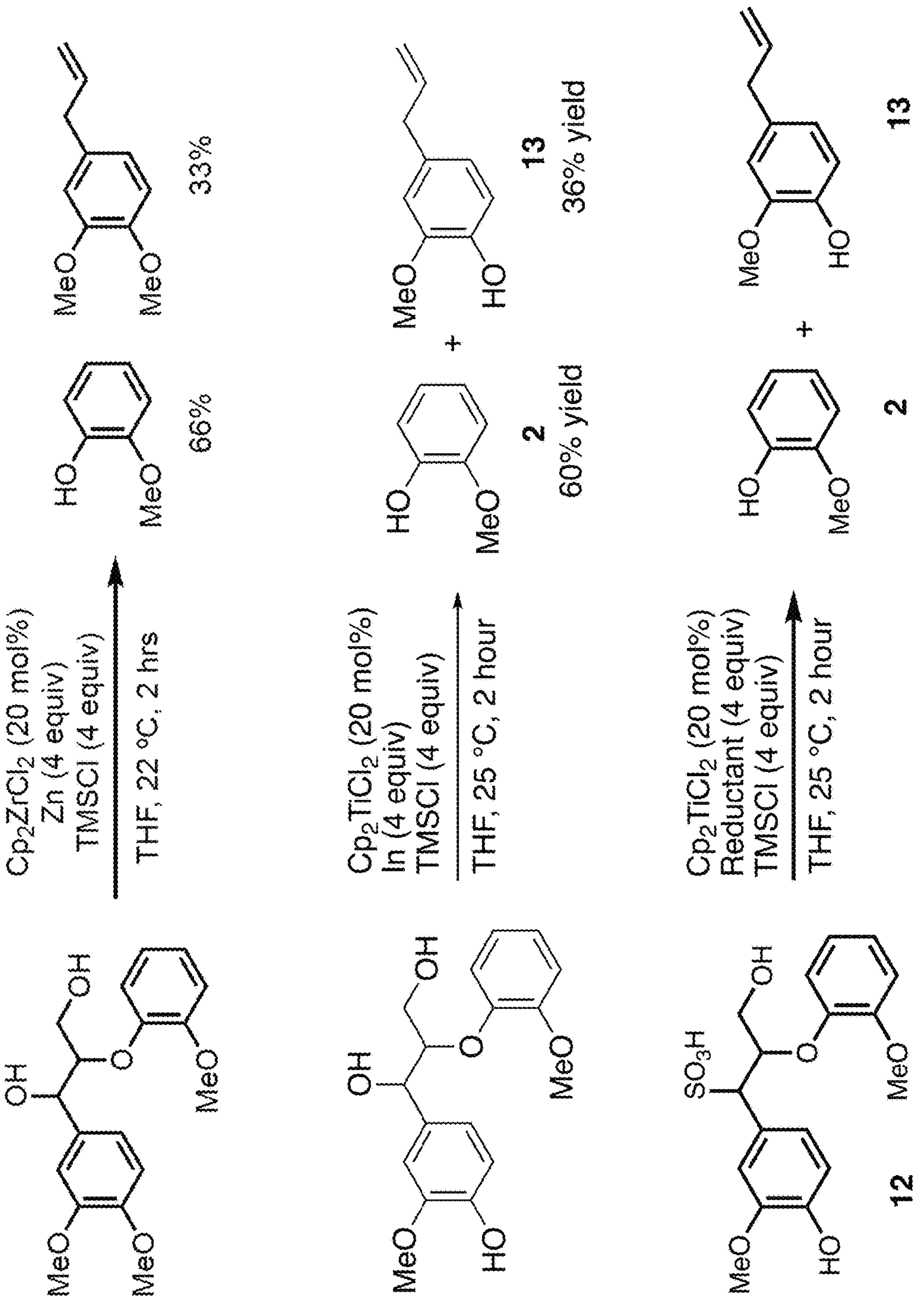
FIG. 15 is a reaction diagram for the Zr-catalyzed reductive cleavage of a model substrate of the β-O-4 linkage of lignin (top); a reaction diagram of optimized Ti-catalyzed conditions applied to a β-O-4 model substrate bearing an unprotected phenol (middle); and); a reaction diagram of Ti catalytic conditions for depolymerizing a lignosulfonate model structure (bottom).

The Ti-catalyzed reductive C—O bond cleavage of lignin was modeled using substrate 1 (FIG. 5), a representative structure of the β-O-4 of lignin. The results are presented in Table 1. Using simple $TiCl_3·3THF$, in combination of Zn as the reductant and TMSCl as the acid resulted in high conversion of 1 to form 2 in good yield at room temperature in two hours (entry 1). Allylarene 3 is likely derived from further reduction of an allylic alcohol intermediate (FIG. 1). The yield of 3 was improved by applying the Cp ligand (entry 2). Bulky catalysts, such as $Cp^*_2TiCl_2$, significantly attenuated the reactivity (entry 3). This result suggests that titanocenes with less steric hindrance, such as ansa-titanocene catalysts (Wang, et al., Chemistry—A European Journal 2005, 11, 669-679), could exhibit higher reactivity. However, no change in yield was observed when ansa-$Me_2Si$-$Cp_2TiCl_2$ and ansa-Cy-$Cp_2TiCl_2$ were employed. Other terminal reductants such as Mn, Fe, and In were also effective. In fact, applying indium as the reductant results in near quantitative yields of 2 and 3 with equal mass balance (entry 8). Other Ti catalysts in combination with indium were less effective (entries 9-13). While not wishing to be bound by any specific theory, it is possible that the low yield of 3 under Lewis acidic conditions may be attributed to polymerization of 3 via a carbocation intermediate (Abadie, et al., Polymer, 1982, 23, 445). The analogous zirconocene catalyst has also demonstrated efficacy in this reaction (FIG. 15, top).

TABLE 1

Catalyst Optimization for C—O Cleavage in Lignin Model Compounds

| Entry | Ti Catalyst | Reductant | 2 (2-TMS) (% yield) | 3 (% yield) |
|---|---|---|---|---|
| 1 | $TiCl_3$•3THF | Zn | 73 | 28 |
| 2 | $Cp_2TiCl_2$ | Zn | 91 | 63 |
| 3 | $Cp^*_2TiCl_2$ | Zn | 85 | 17 |
| 4 | ansa-$Me_2Si$-$Cp_2TiCl_2$ | Zn | 90 | 24 |
| 5 | ansa-Cy-$Cp_2TiCl_2$ | Zn | 83 | 8 |
| 6 | Cp*TiCl3 | Zn | 50 | 46 |
| 7 | $Cp_2TiCl_2$ | Mn | 43 | <1 |
| 8 | $Cp_2TiCl_2$ | Fe | 91 | 2 |
| 9 | $Cp_2TiCl_2$ | In | 95 | 97 |
| 10 | $TiCl_3$•3THF | In | 77 | 14 |
| 11 | $Cp^*_2TiCl_2$ | In | 80 | 24 |
| 12 | $Ti(coll)Cl_4$ | In | 85 | 7 |
| 13 | ansa-Cy-$Cp_2TiCl_2$ | In | 92 | 9 |
| 14 | $Cp_2Ti(OMs)_2$ | In | 95 | 96 |
| 15 | $Cp^*TiCl_3$ | In | 52 | 13 |

Other components of the reaction are also optimized. Additives, such as radical inhibitors and persistent radicals, may improve the mass balance by preventing polymerization of the allylarene products. Example includes BHT, hydroquinone, and TEMPO derivatives. Undesired radical polymerization could also be prevented by quenching the allylic radical intermediate by H-atom donors, such as Hantzch ester and 1,4-cyclohexadiene. Studies of reaction conditions for the conversion of model system 1 into phenol 2 and allyl benzene 3 (FIG. 5) are presented in Table 2.

TABLE 2

Additional Condition Development Data[a]

| Entry | O-trap | additive | solvent | Reductant | T (° C.) | % yield 2 (2-TMS) | % yield 3 |
|---|---|---|---|---|---|---|---|
| 1 | TMSCl | none | MeOH | Zn | 22 | 61 | <1 |
| 2 | TMSCl | none | EtOH | Zn | 22 | 53 | <1 |
| 3 | TMSCl | none | iPrOH | Zn | 22 | 69 | <1 |
| 4 | TMSCl | none | tBuOH | Zn | 22 | 55 | 20 |
| 5 | TMSCl | none | Ethylene glycol | Zn | 22 | 88 | <1 |
| 6 | TMSCl | none | 1,4-dioxane | Zn | 22 | 92 | <1 |
| 7 | TMSCl | none | acetone | Zn | 22 | 92 | <1 |
| 8 | TMSCl | none | AcOH | Zn | 22 | 90 | <1 |
| 9 | TMSCl | none | DMSO | Zn | 22 | 79 | <1 |
| 10 | TMSCl | none | ether | Zn | 22 | 15 | 7 |
| 11 | TMSCl | none | toluene | Zn | 22 | 44 | 3 |

TABLE 2-continued

| Additional Condition Development Data[a] | | | | | | | |
|---|---|---|---|---|---|---|---|
| Entry | O-trap | additive | solvent | Reductant | T (° C.) | % yield 2 (2-TMS) | % yield 3 |
| 12 | TMSCl | none | benzene | Zn | 22 | 50 | 4 |
| 13 | TMSCl | none | Me-THF | Zn | 22 | 93 | 63 |
| 14 | TMSCl | none | Me-THF | In | 22 | 89 | 93 |
| 15 | TMSCl | Hantzsch ester (4 eq) | THF | Zn | 22 | 0 | 0 |
| 16 | TMSCl | MeOH (4 eq) | THF | Zn | 22 | 82 | 24 |
| 17 | TMSCl | tBuOH (4 eq) | THF | Zn | 22 | 87 | 11 |
| 18 | TMSCl | PhOH (4 eq) | THF | Zn | 22 | 0 | 0 |
| 19 | TMSCl | PhSH (4 eq) | THF | Zn | 22 | 91 | <1 |
| 20 | TMSCl | AcOH (4 eq) | THF | Zn | 22 | 84 | 9 |
| 21 | TMSCl | MeOH (0.5 eq) | THF | Zn | 22 | 90 | 49 |
| 22 | TMSCl | EtOH (0.5 eq) | THF | Zn | 22 | 87 | 64 |
| 23 | TMSCl | iPrOH (0.5 eq) | THF | Zn | 22 | 89 | 54 |
| 24 | TMSCl | HFIP (0.5 eq) | THF | Zn | 22 | 86 | 61 |
| 25 | TMSCl | tBuOH (0.5 eq) | THF | Zn | 22 | 89 | 58 |
| 26 | TMSCl | $H_2O$ (4 eq) | THF | Zn | 22 | 86 | <1 |
| 27 | TMSCl | air | THF | Zn | 22 | 72 | 85 |
| 28 | TMSCl | BHT (0.5 eq) | THF | Zn | 22 | 49 | 30 |
| 29 | TMSCl | Phenothiazine (0.5 eq) | THF | Zn | 22 | 86 | 40 |
| 30 | TMSCl | Hydroqiunone (0.5 eq) | THF | Zn | 22 | 50 | 72 |
| 31 | TMSCl | 4-OH-TEMPO (0.5 eq) | THF | Zn | 22 | <1 | 34 |
| 32 | TMSCl | 4-OAc-TEMPO (0.5 eq) | THF | Zn | 22 | 35 | 58 |
| 33 | TMSCl | $CuCl_2$ (0.5 eq) | THF | Zn | 22 | 61 | 26 |
| 34 | TMSCl | Cu (0.5 eq) | THF | Zn | 22 | 48 | 44 |
| 35 | TMSCl | CuI (0.05 eq) | THF | Zn | 22 | 19 | 45 |
| 36 | TMSCl | 4-tBu-catechol (0.05 eq) | THF | Zn | 22 | 61 | 63 |
| 37 | TMSCl | 4-tBu-hydroquinone (0.05 eq) | THF | Zn | 22 | 40 | 54 |
| 38 | TMSCl | CuI (0.05 eq) | THF | Zn | 22 | 19 | 45 |
| 39 | TMSCl | Benzoquinone (0.5 eq) | THF | Zn | 22 | 59 | 25 |
| 40 | TMSCl | Hydroquinone (1 eq) | THF | Zn | 22 | 83 | 26 |
| 41 | TMSCl | Hydroquinone (0.25 eq) | THF | Zn | 22 | 82 | 44 |
| 42 | TMSCl | Hydroquinone (0.1 eq) | THF | Zn | 22 | 92 | 47 |
| 43 | TMSCl | Hydroquinone (0.05 eq) | THF | Zn | 22 | 91 | 51 |
| 44 | TMSCl | Hydroquinone (0.05 eq) and air | THF | Zn | 22 | 85 | 35 |
| 45 | HCl | Hydroquinone (0.05 eq) | THF | Zn | 22 | 47 | 19 |
| 46 | HCl | air | THF | Zn | 22 | 56 | 22 |
| 47 | HCl | none | THF | Zn | 22 | 82 | 7 |
| 48 | $Et_3N$•HCl | none | THF | Zn | 22 | <1 | <1 |
| 49 | $NH_4Cl$ | none | THF | Zn | 22 | 0 | 0 |
| 50 | HMDS | none | THF | Zn | 22 | 0 | 0 |
| 51 | $B_2pin_2$ | none | THF | Zn | 22 | 85 | 0 |
| 52 | $NaBH_4$ | none | THF | none | 22 | 75 | <1 |
| 53 | TMSCl | none | THF | $NaBH_4$ | 22 | 68 | <1 |
| 54 | TMSCl | none | THF | $Si_2Me_6$ | 22 | 24 | 0 |
| 55 | TMSCl | none | THF | $Ph_2SiH_2$ | 22 | 31 | 0 |
| 56 | TMSCl | none | THF | $PhSiH_3$ | 22 | 26 | 0 |
| 57 | TMSCl | none | THF | $(OEt)_3SiH$ | 22 | 14 | 0 |
| 58 | TMSCl | none | THF | $Ph_3SiH$ | 22 | 30 | 0 |
| 59 | TMSCl | none | THF | $Et_3SiH$ | 22 | 28 | 0 |
| 60 | TMSCl | none | THF | $Et_2SiH_2$ | 22 | 25 | 0 |
| 61 | TMSCl | none | THF | TMS-pyrazine | 22 | 30 | 0 |
| 62 | TMSCl | none | THF | $Si_2Me_6$ | 115 | 43 | 0 |
| 63 | TMSCl | none | THF | Zn | 75 | 83 | 59 |
| 64 | TMSCl | none | THF:MeOH (1:1) | Zn | 22 | <1 | <1 |
| 65 | TMSCl | none | THF:iPrOH (1:1) | Zn | 22 | 67 | 65 |
| 66 | TMSCl | none | THF:pyridine (1:1) | Zn | 22 | <1 | <1 |
| 67 | TMSCl | none | THF:Ethylene glycol (1:1) | Zn | 22 | 58 | 27 |
| 68 | TMSCl | none | THF:toluene | Zn | 22 | 65 | 33 |
| 69 | TMSCl | none | THF:EtOAc | Zn | 22 | 74 | 50 |
| 70 | TMSCl | none | THF:DCM | Zn | 22 | 68 | 31 |

Optimized Ti-catalyzed conditions were applied to a β-O-4 model substrate bearing an unprotected phenol (FIG. 15, middle). The reaction proceeded to full conversion and afforded 2 and the corresponding allyl benzene product 13 in 60% and 36% yields, respectively.

Ti(III) complexes are known for their reactivity towards epoxides, which generates Ti(IV) and an organic radical (FIG. 4) (Qian, et al., Chem. Rev. 2003, 103, 2633-2690; Beaumier, et al. Nature Reviews Chemistry 2019, 3, 15-34; McCallum, et al., The Journal of Organic Chemistry 2019, 84, 14369-14380). This reactivity can be applied to cleave β-β and β-5 linkages. The formation of a benzylic radical drives C—O bond cleavage; subsequent β-scission events provide the thermodynamic driving force for C—O bond cleavage. The resulting allylic alcohol derivatives is further reduced to allyl arene products. Ti(III) is envisioned to mediate a similar benzylic C—O bond cleavage at the β-5 linkage. Protonation at the ortho-position of the phenol followed by β-scission cleaves the C—C bond. The product is stabilized by formation of a phenol radical.

Example 2: Reverse-Biosynthetic Depolymerization of Authentic Lignin Samples

Figure 8:
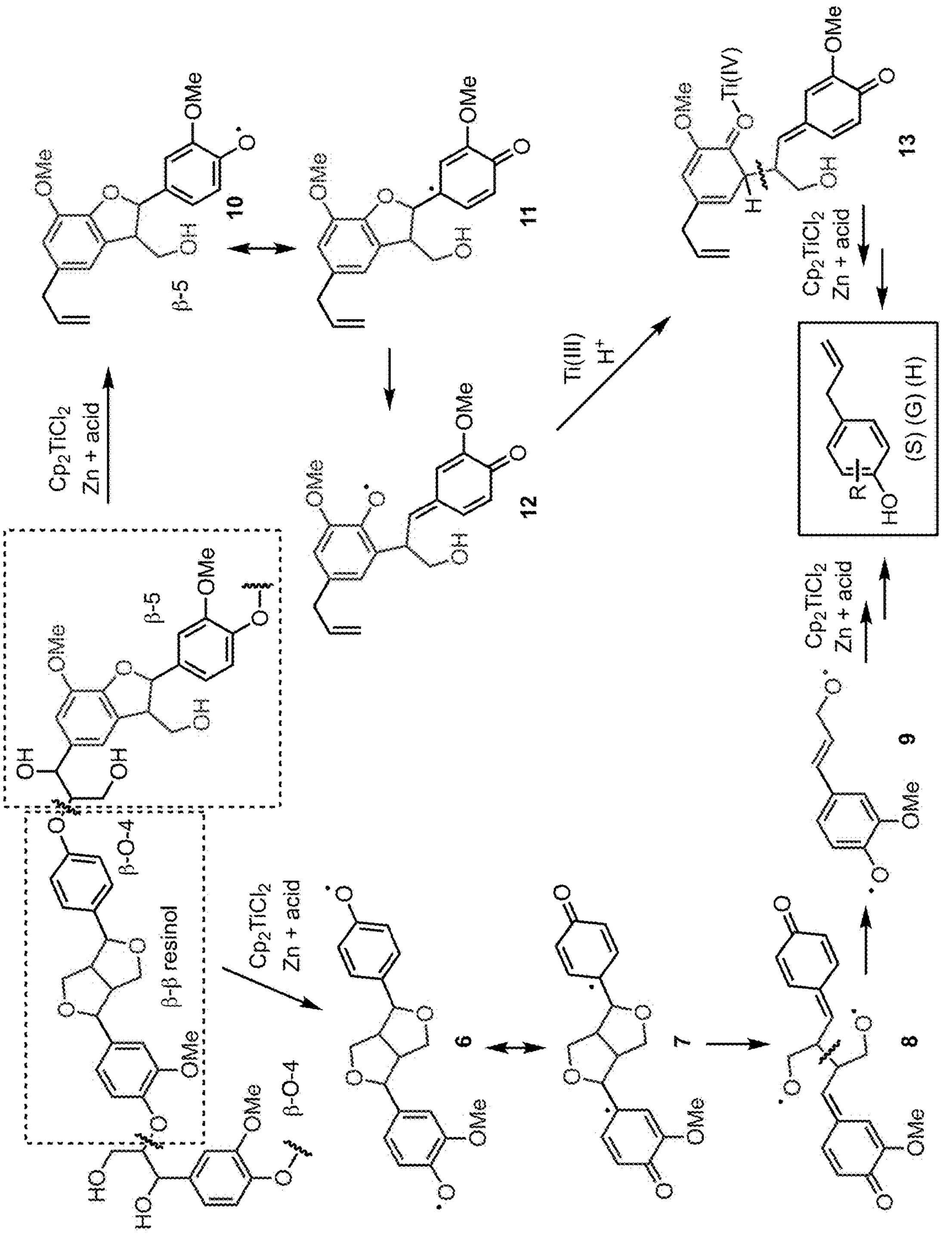
FIG. 8 is a scheme depicting the mechanistic rationale for reverse-biosynthetic lignin polymer degradation.

The facile reactivity of Ti catalysts in reductive cleavage of the model substrate of the β-O-4 linkage encouraged an investigation into their utility in depolymerizing authentic lignin samples. Cleavage of the β-O-4 linkage is expected to result in phenol radicals that are intermediates for oxidative polymerization in lignin biosynthesis pathways. Under reductive conditions, the reverse-biosynthetic pathway could occur to disconnect the polymers into smaller fragments (FIG. 2B and FIG. 8). In the β-β resinol linkage, phenol radical 6 is in resonance with intermediate 7, which can undergo β-scission to break the ether bonds and form intermediate 8. A sequence of proton and electron transfer steps cleaves the C—C bond and affords phenol radical 9. The resulting p-hydroxycinnamic alcohol product is further reduced to generate allyl benzene derivatives. In the β-5 linkage, the phenol radical resonance structure 11 undergoes β-scission, analogous to that of the β-β linkage, to cleave the benzylic C—O bond. Subsequent proton transfer and electron transfer processes are mediated by Ti(III) catalysts. Eventually, the oxygen atoms will be reduced to give allyl arene products. The Ti catalyst can directly react with the β-β and β-5 linkages, resulting in efficient degradation of the lignin polymer.

Native lignin polymers are extracted from lignocellulose, such that celluloses and hemicelluloses are removed (Bhalla, et al., Biotechnology for Biofuels 2016, 9, 34). Here, hybrid poplar was pretreated with a copper-catalyzed alkaline hydrogen peroxide method (Cu-AHP) to yield a lignin sample. Studies show that this treatment preserves the lignin structure, while removing cellulose and hemicelluloses. The average length of a linear lignin chain in poplar is estimated to be 13-20 units.

Figure 9:
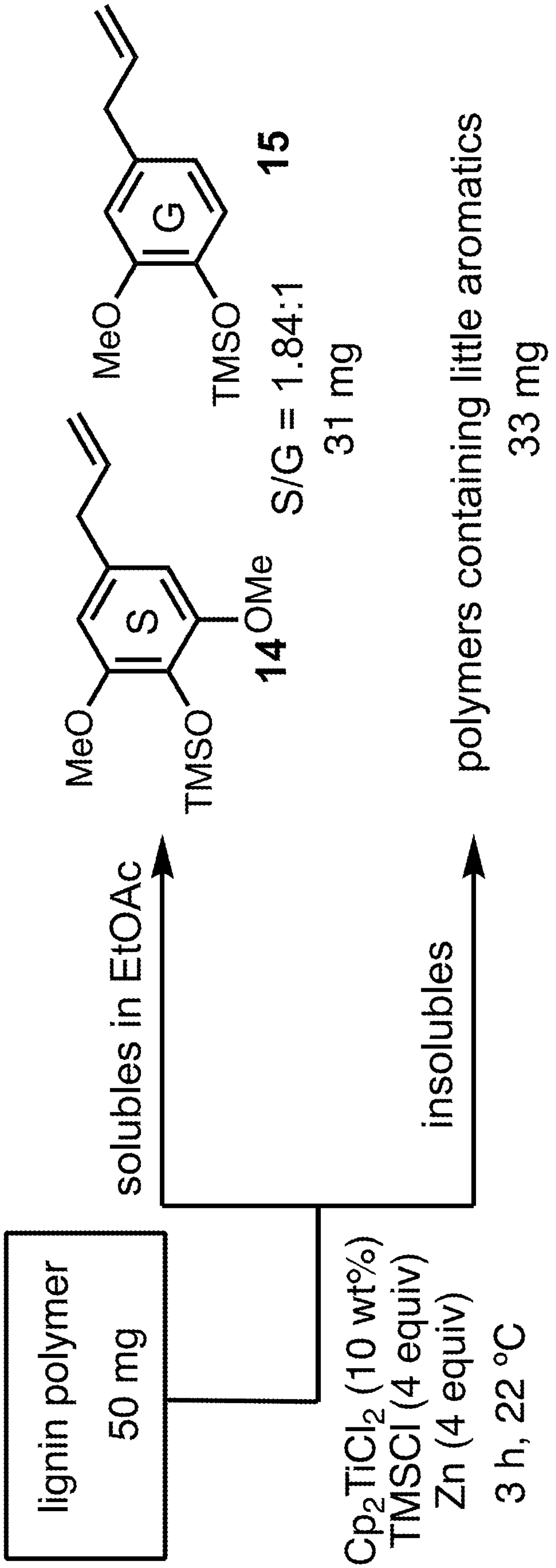
FIG. 9 is a scheme depicting the depolymerization of an exemplary lignin polymer.
Figure 10:
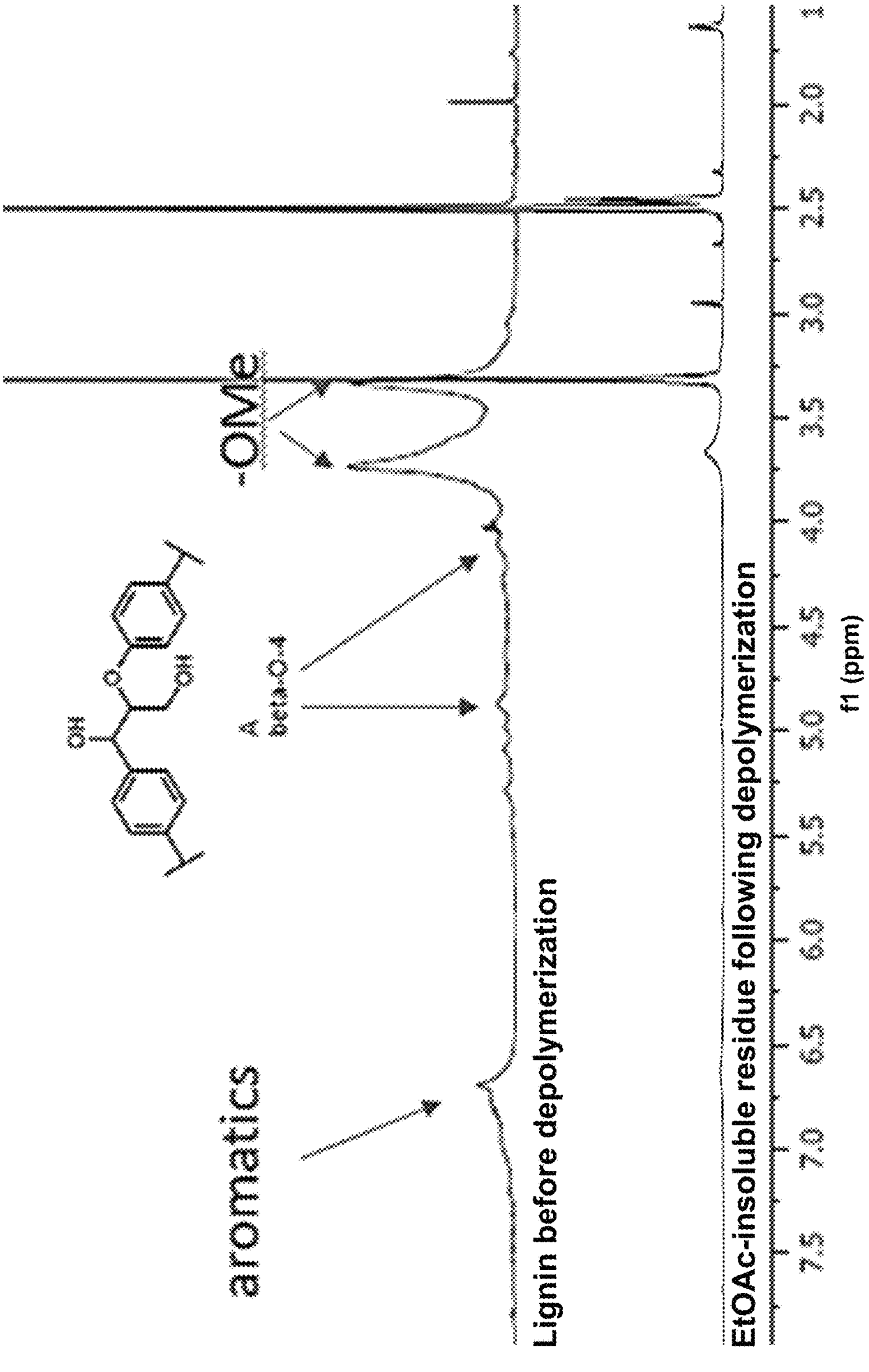
FIG. 10 depicts $^{1}H$ NMR spectra of lignin samples before and after depolymerization.
Figure 11:
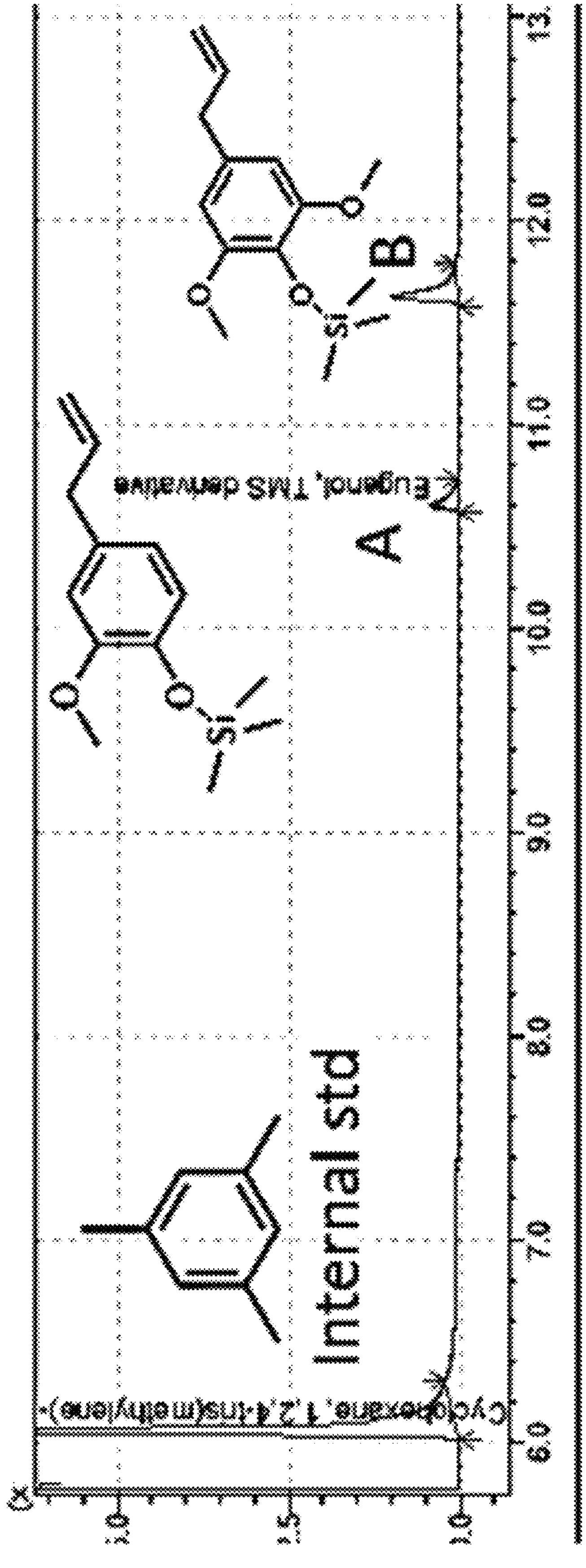
FIG. 11 is a gas chromatograph-mass spectrometry (GC-MS) trace of the products of the lignin depolymerization.

Initial tests were performed using a small quantity of lignin sample (25 mg). These lignin samples are treated with optimized reductive depolymerization conditions for 3 h at room temperature. Extracting the resulting mixture with ethyl acetate afforded 31 mg of soluble product (FIG. 9). Directly submitting this sample to $^1$H NMR (FIG. 11) and GC-MS (FIG. 12) analysis reveals clean formation of two products, 14 and 15, reflecting S and G as the major components. Products 14 and 15 are derived from a sequence of C—O and C—C bond cleavage reactions going through radical intermediates (FIG. 9). The free phenol groups are protected by excess TMSCl. Based on the molecular weights of the TMS-protected allyl arene and the unprotected allyl arene, products 14 and 15 account for 50% of the original lignin sample. It is remarkable to note that no other peaks were observed in GC. The ratio of 14:15 is estimated to be 1.84:1, similar to the natural S:G ratio of 2.14 (Bhalla, et al., Biotechnology for Biofuels 2016, 9, 34). Variations of the S/G ratio between the natural sample and the products has been predicted by previous studies (Anderson, et al., Nature Communications 2019, 10, 2033). Dissolving the byproduct residue from ethyl acetate extraction into DMSO-$d_6$ and analyzing the sample by $^1$H NMR spectroscopy reveals substantially fewer aromatic and ether resonances, suggesting that the majority of the β-O-4, β-5, and β-β fragments have been converted.

Figure 12:
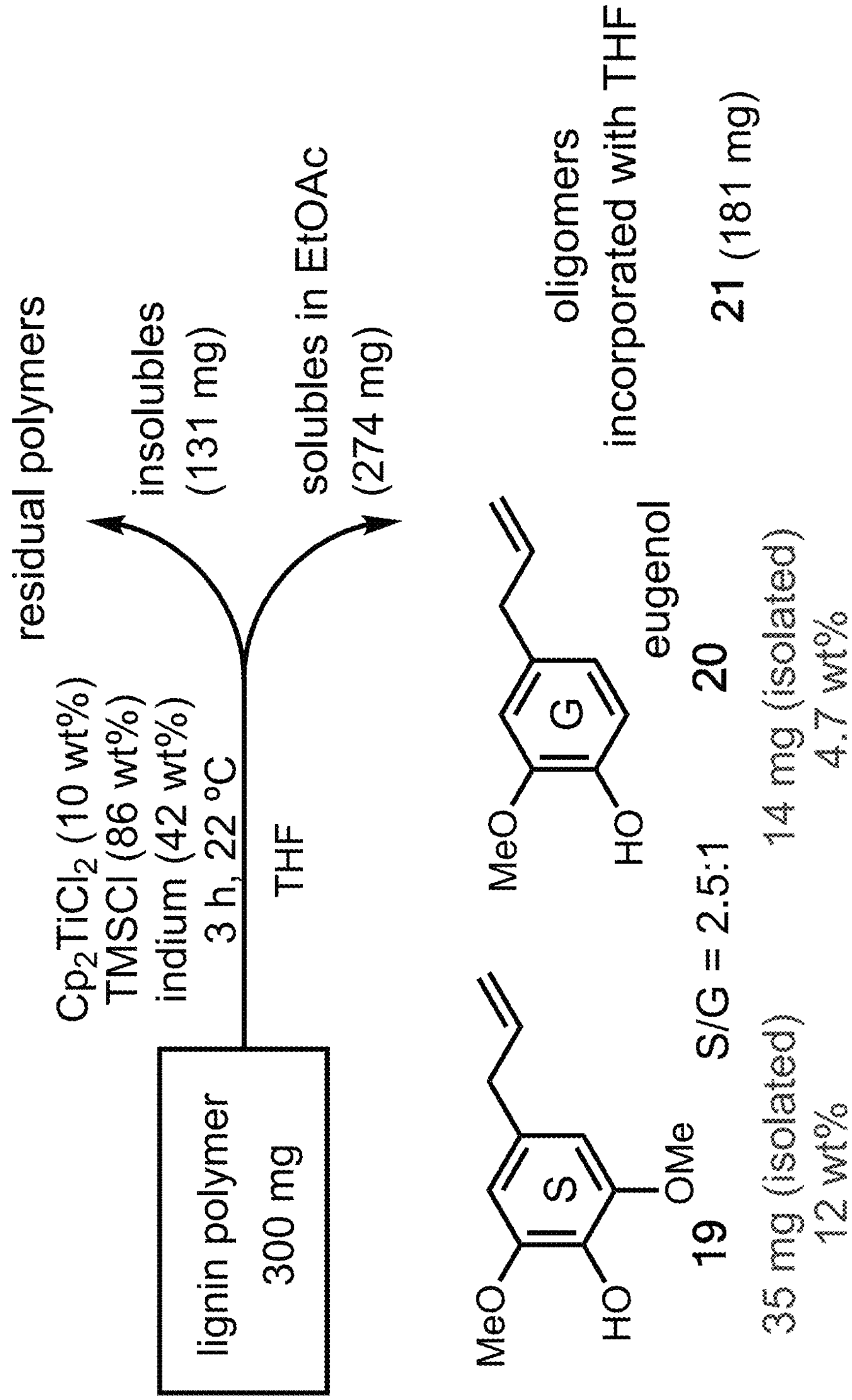
FIG. 12 is a scheme depicting an exemplary depolymerization of a lignin polymer.
Figure 16:
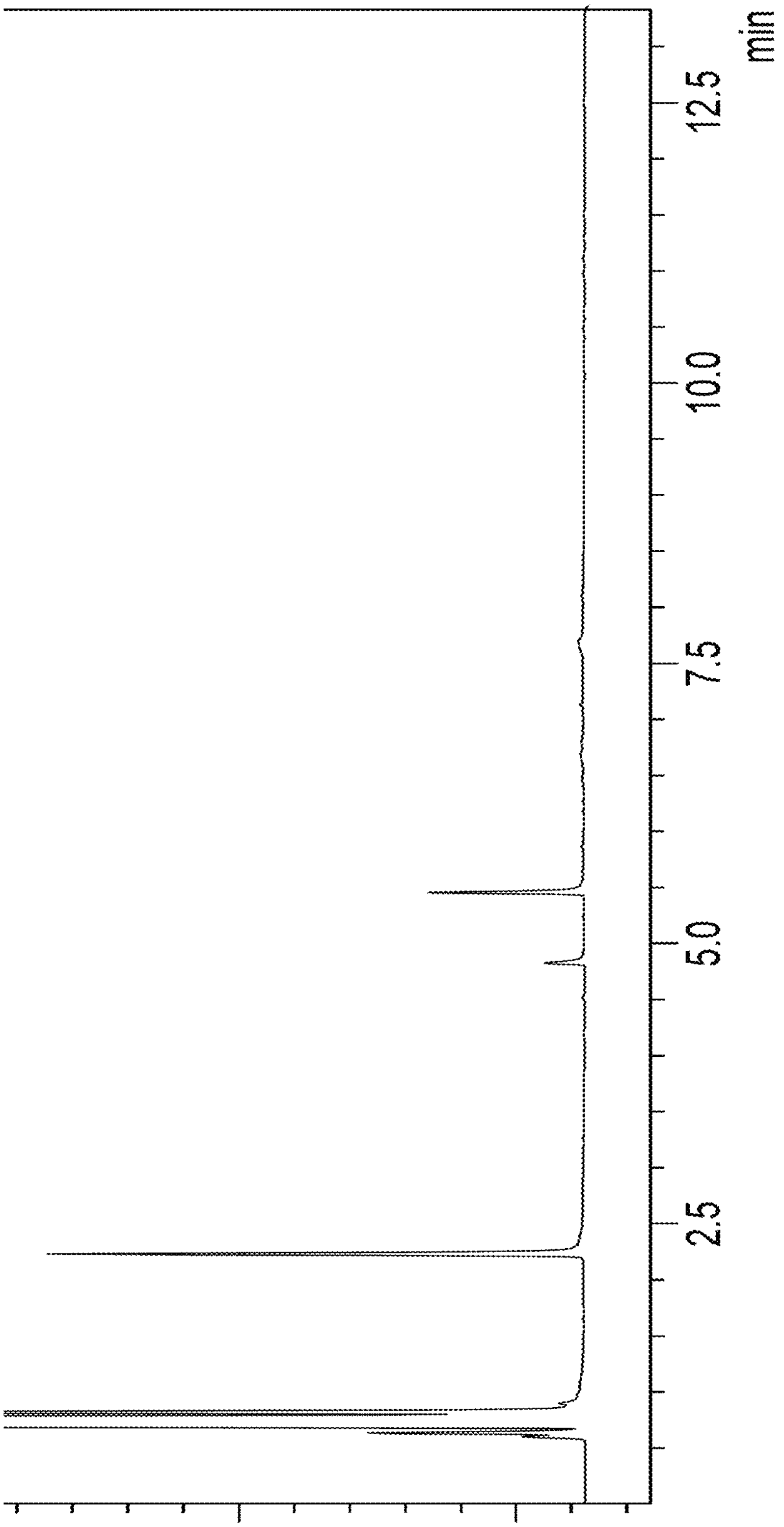
FIG. 16 is a GC-MS trace showing the reaction products of the depolymerization reaction.

A higher scale reaction was also performed. A lignin sample obtained from Cu-AHP treatment of hybrid poplar (300 mg) was subjected to the optimized reaction conditions: $Cp_2TiCl_2$ in combination with indium and TMSCl, for 3 h at room temperature (FIG. 12). After quenching the reaction with HCl, extracting the resulting mixture with ethyl acetate afforded 274 mg of a soluble material and 131 mg of an insoluble fragment. The insoluble fragment has comparable $M_w$ and $M_n$ to the original lignin, evident by GPC analysis. Analysis of the soluble component by GC-MS revealed formation of allyl arene products, 19 and 20, as the only low-molecular weight products (FIG. 16). The high selectivity for low-molecular weight products permitted the isolation and purification of the products by passing the crude material through flash chromatography to afford 35 mg (12 wt %) of 19 and 14 mg (4.7 wt %) of 20 as colorless oil. The S:G ratio of 2.5:1 is slightly higher than the natural distribution of 2.14 (Anderson, et al., Nat. Commun. 2019, 10, 2033). Zinc is a cheaper reductant than indium; replacing indium with zinc afforded 19 in 6.2 wt % and 20 in 3.4 wt % isolated yield. Performing the reaction on 1 gram of Cu-AHP lignin affords 19 and 20 in 11.5 and 4.1 wt %, respectively.

Other conditions have been examined for Cu-AHP lignin degradation (Table 3). Increasing the loading of reductant resulted in lower yields of 19 and 20 (entries 2,8). It should be noted that the larger scaled reactions are generally higher yielding then smaller scaled reactions. Additionally, increasing the Ti loading to 100 wt % is detrimental to yield. Other solvents significantly diminished reactivity. The addition of chelating agents such as EDTA and 15-crown-5 did not suppress potential side polymerization reactions.

TABLE 3

Condition Optimization for Depolymerization of Cu-AHP lignin

| Entry | Ti Catalyst (wt %) | Additive | Solvent | Reductant | 4 (wt % yield) | 5 (wt % yield) |
|---|---|---|---|---|---|---|
| 1 | $Cp_2TiCl_2$ (10 wt %) | none | THF | Zn (28 wt %) | 3.0[a] | 5.0[a] |
| 2 | $Cp_2TiCl_2$ (10 wt %) | none | THF | Zn (52 wt %) | 3.3[a] | 1.6[a] |
| 3 | $Cp_2TiCl_2$ (5 wt %) | none | THF | In (42 wt %) | 1.8[a] | 4.0[a] |
| 4 | $Cp_2TiCl_2$ (10 wt %) | none | THF | In (42 wt %) | 2.9[a] | 6.9[a] |
| 5 | $Cp_2TiCl_2$ (20 wt %) | none | THF | In (42 wt %) | 3.0[a] | 12.4[a] |
| 6 | $Cp_2TiCl_2$ (50 wt %) | none | THF | In (42 wt %) | 6.1[a] | 5.5[a] |
| 7 | $Cp_2TiCl_2$ (100 wt %) | none | THF | In (42 wt %) | 1.6[a] | 2.8[a] |
| 8 | $Cp_2TiCl_2$ (10 wt %) | none | THF | In (116 wt %) | 3.0[a] | 10.0a |
| 9[b] | $Cp_2TiCl_2$ (10 wt %) | none | THF | In (42 wt %) | 2.6[a] | 5.7[a] |
| 10 | $Cp_2TiCl_2$ (10 wt %) | none | Me-THF | In (42 wt %) | trace | trace |
| 11 | $Cp_2TiCl_2$ (10 wt %) | none | THP | In (42 wt %) | trace | trace |
| 12 | $Cp_2TiCl_2$ (10 wt %) | none | DMPU | In (42 wt %) | trace | trace |
| 13 | $Cp_2TiCl_2$ (10 wt %) | none | DME | In (42 wt %) | trace | trace |
| 14 | $Cp_2TiCl_2$ (10 wt %) | EDTA | THF | Zn (52 wt %) | 2.0 | 2.2 |

TABLE 3-continued

Condition Optimization for Depolymerization of Cu-AHP lignin

| Entry | Ti Catalyst (wt %) | Additive | Solvent | Reductant | 4 (wt % yield) | 5 (wt % yield) |
|---|---|---|---|---|---|---|
| 15 | $Cp_2TiCl_2$ (10 wt %) | 15-crown-5 | THF | Zn (52 wt %) | 1.9 | 2.8 |
| 16 | $Cp_2TiCl_2$ (10 wt %) | EDTA | THF | In (42 wt %) | 2.3[a] | 4.5[a] |
| 17 | $Cp_2TiCl_2$ (10 wt %) | 15-crown-5 | THF | In (42 wt %) | 3.4[a] | 11.2[a] |

Conditions: Cu-AHP lignin (25 mg), TMSCl (100 wt %), THF (0.25 mL), 22° C.
[a]Average of two runs.
[b]TMSCl (52 wt %).

Other conditions were examined for lignin polymer degradation (Table 4). Opening the reaction to air or addition of hydroquinone to minimize undesired side radical pathways resulted in lower conversion of the lignin to soluble products, but retained the natural S:G ratio. Replacing TMSCl with HCl resulted in a decrease of reactivity, although desired product has been observed in the $^1H$ NMR spectrum of the ethyl acetate extract.

TABLE 4

Test of other conditions for lignin degradation.[a]

| Ti (wt %) | Acid | Additive | Mass of solubles (mg) | Mass of insoluble (mg) | S/G ratio |
|---|---|---|---|---|---|
| $TiCp_2Cl_2$ (10 wt %) | TMSCl | none[a] | 31 | 33 | 1.84 |
| $TiCp_2Cl_2$ (10 wt %) | TMSCl | air | 12 | 57 | 1.91 |
| $TiCp_2Cl_2$ (10 wt %) | TMSCl | Hydroquinone (5 mol %) | 17 | 41 | 1.64 |
| $TiCp_2Cl_2$ (10 wt %)[b] | HCl | none | 7 | 29 | 0.92 |
| ansa-$Me_2Si$-$Cp_2TiCl_2$ (6 wt %) | TMSCl | none | 16 | 42 | NA |

[a]Conditions: lignin polymer (50 mg), Zn (26 mg; 2 equiv), temperature: 22° C.
[b]lignin polymer (25 mg).

TMSCl proved to be an effective acid to accept the oxygen atom. Preliminary results on replacing TMSCl with HCl and $H_2SO_4$ has shown competency in using simple Bronsted acids (FIG. 12). Improving the reaction conversion with new acids is accompanied by evaluation of different Ti catalysts, such that a structure-activity relationship may be developed (Qian, et al., Chem. Rev. 2003, 103, 2633-2690). The reactivity of ligandless $TiCl_3$ (Table 1, entry 1) suggests that a large scope of Ti catalysts would work for this reaction.

Raw sawdust contains lignin and glucose. Since the Ti catalyst is selective for benzylic alcohols, the reverse-biosynthetic depolymerization is employed to depolymerize lignin from the raw materials without pre-treatment to remove celluloses and hemicelluloses.

Example 3: Electrocatalytic Lignin Depolymerization

Figure 13:
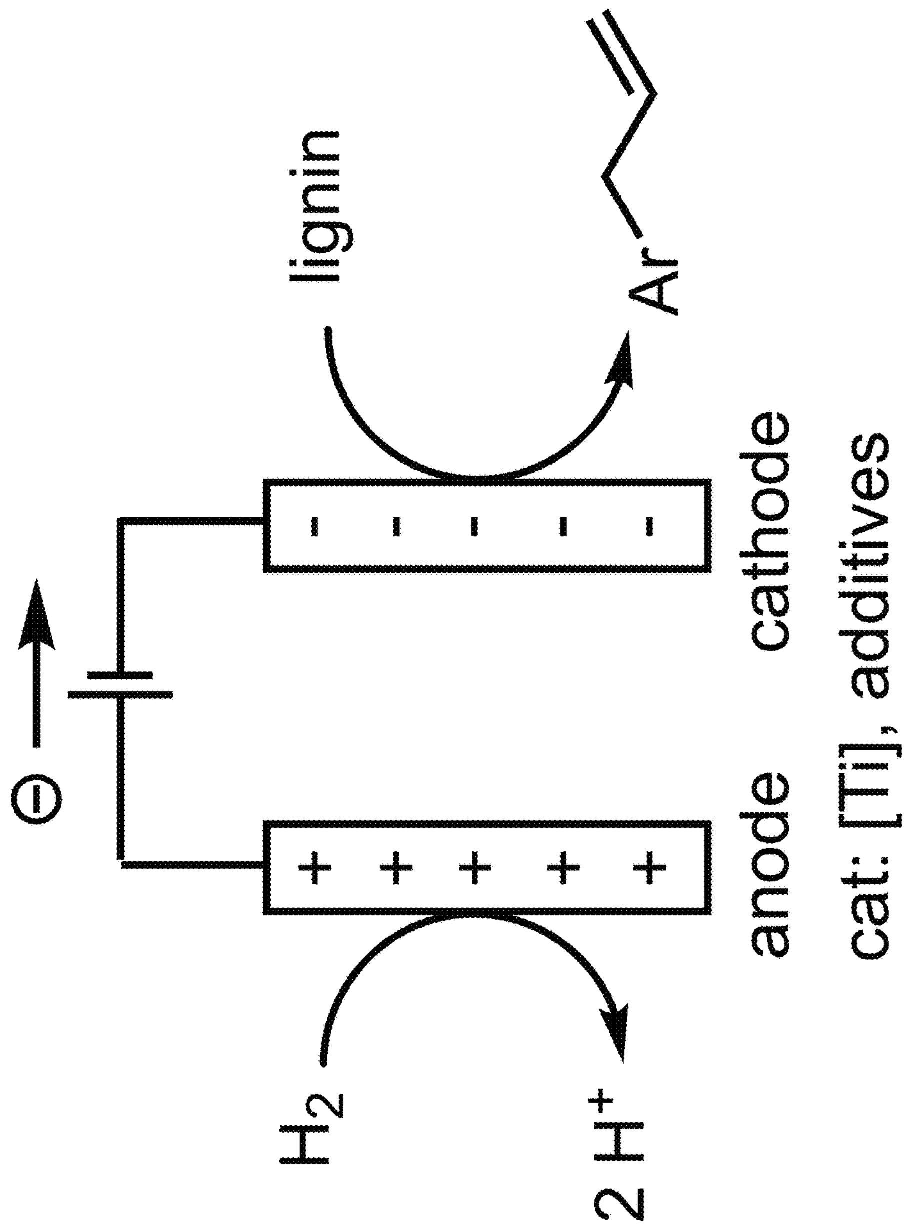
FIG. 13 is a schematic of an exemplary electrolytic cell for the depolymerization of lignin.

Electrocatalysis has emerged as an effective method to mediate redox processes without requiring the oxidant and the reductant to directly react with each other (Tuck, et al., Science 2012, 337, 695-699). Electrocatalysis would allow us to evaluate a series of reductants in divided cells. Under electrocatalytic conditions, lignin reduction and Ti reduction will occur at the cathode, while reductants are oxidized at the anode to provide electrons (FIG. 13). Alternative reductants to Zn powder include inexpensive, sacrificial metal electrodes or soluble organic/inorganic reductants. Examples include aluminum or zinc electrodes and amines such as $Et_3N$ and $iPr_2NH$. Using hydrogen ($H_2$) as the reductant generates $H_2O$ as the stoichiometric by-product.

Figure 14:
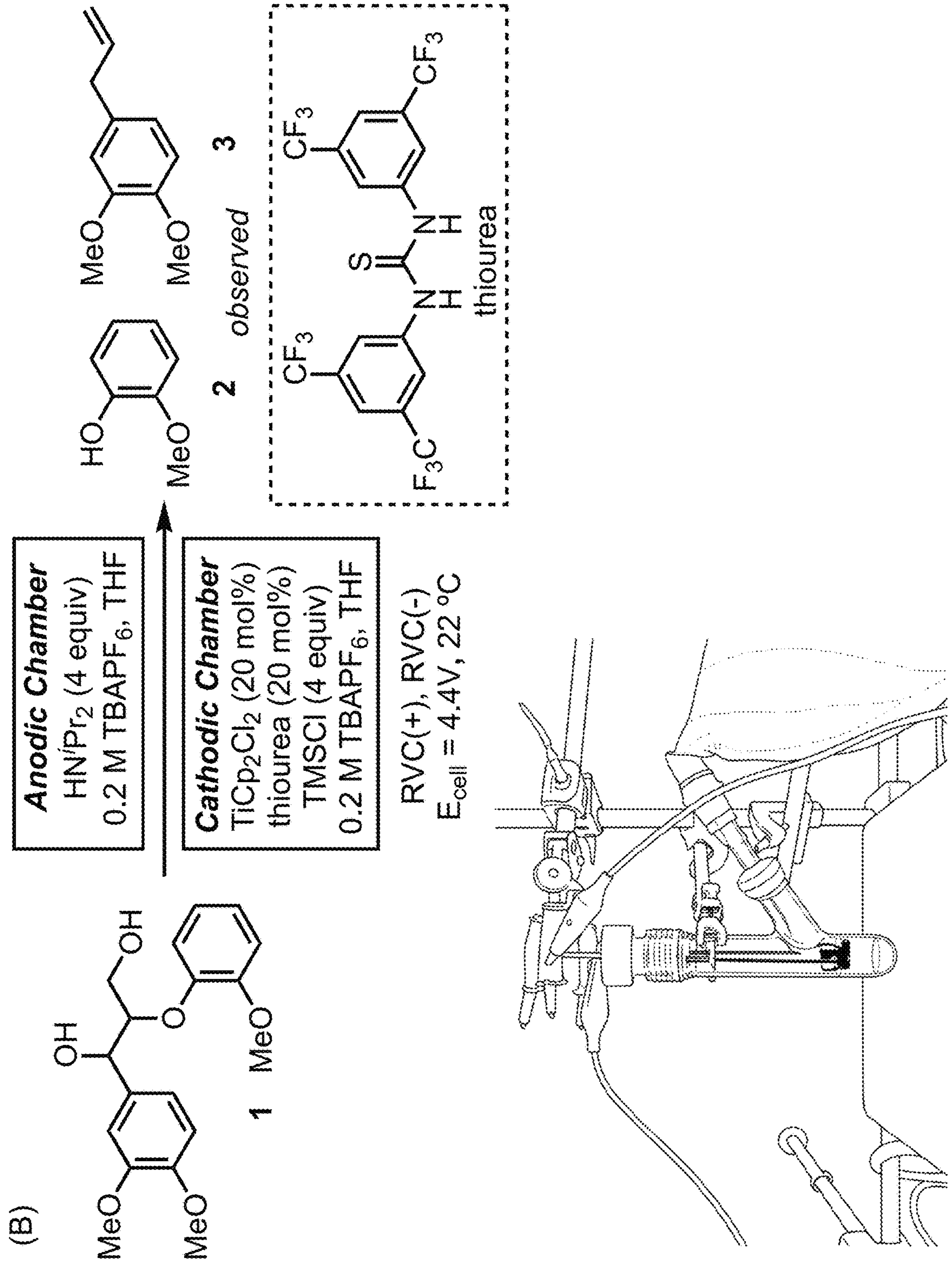
FIG. 14 depicts an exemplary electrolytic depolymerization reaction and apparatus.

A preliminary study on electrocatalytic reductive cleavage of model substrate 1 reveals that products 2 and 3 could be obtained with $iPr_2NH$ as the reductant (FIG. 14). The reaction is promoted by addition of thiourea, which may facilitate regeneration of $Cp_2Ti(III)Cl$ via halide extraction (Angew. Chem. Int. Ed. 2018, 57, 5006-5010). Since catalytic $Cp_2TiCl_2$ has demonstrated high efficiency, the compatibility of this catalyst with electroreduction conditions is conceivable. The oxidation of reductants at the electrode affects the cell potential and the electric current. HCl and other Bronsted acids are suitable acid derivatives. In order to avoid hydrogen evolution on the cathode, electrodes, such as lead or mercury, can be used to increase the overpotential for hydrogen evolution.

Example 4: Photocatalytic Lignin Depolymerization

Photoredox catalysis represents an alternative method to induce homolytically cleavage of C—O bonds in lignin and trigger the microscopic reverse biosynthesis. Oxalates have emerged as a convenient auxiliary for the activation of alcohols, which operate via abstraction of the O-atom in the form of $CO_2$ generation under photocatalytic conditions (Lackner, et al., J. Am. Chem. Soc. 2013, 135, 15342-15345; Nawrat, et al., J. Am. Chem. Soc. 2015, 137, 11270-11273; Zhang, et al., J. Am. Chem. Soc. 2016, 138, 13862-13865; Ye, et al., J. Am. Chem. Soc. 2019, 141, 820-824). This strategy was utilized to initiate the formation of a benzylic radical in the β-O-4 linkage. Compared to the titanium conditions, this new catalyst circumvents the use of stoichiometric reductants, lowering the overall cost of the process. The mechanism also bypasses a carbocation intermediate, which reduces the formation of undesired byproducts and results in higher yields.

Materials and Methods

Figure 17:
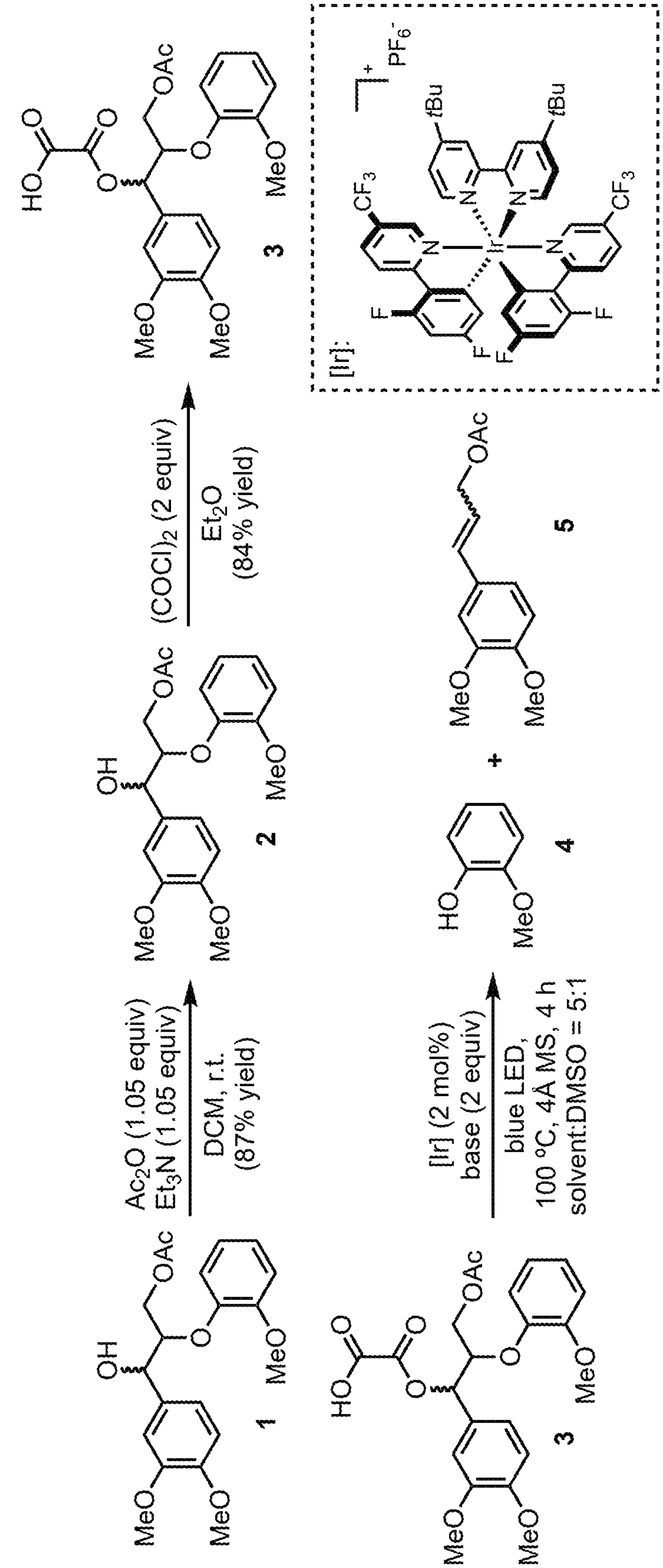
FIG. 17 is a reaction scheme of an exemplary photoredox-triggered lignin depolymerization process.

Synthesis of 3 (FIG. 17). A solution of 1 and triethylamine in DCM was cooled to 0° C. followed by the dropwise addition of acetic anhydride. The mixture was slowly warmed to room temperature and stirred overnight. The reaction mixture was diluted with water and extracted with $CH_2Cl_2$ three times. Organic layers were combined, dried over sodium sulfate, filtered, and concentrated. Crude material was purified by flash column chromatography on silica gel (1:1 hexanes:EtOAc) to afford 2 in 87% yield as a colorless oil. Compound 2 was diluted with a 1:2 mixture of $CH_2Cl_2$ and $Et_2O$ and cooled to 0° C. Oxalyl chloride added dropwise. The reaction mixture was slowly warmed to room temperature and stirred overnight and then cooled to 0° C.

and quenched with dropwise addition of water. The reaction was warmed to room temperature and stirred for an additional hour, extracted with $CH_2Cl_2$ three times, dried over sodium sulfate, filtered, and concentrated. The crude material was purified by flash column chromatography on silica gel (hexane/EtOAc gradient 2:1 to 1:1 then DCM/MeOH 10:3) to afford 3 in 81% yield as a colorless oil.

Photoredox Degradation of 3. A 4 mL-scintillation vial equipped with a Teflon septum and magnetic stir bar was charged with $(Ir[dF(CF_3)ppy]_2(dtbpy))PF_6$ and base inside a glovebox. Lignin substrate 3 in DMSO was added outside the box along with degassed solvent. The reaction vial was sealed and preheated to 70° C. The reaction was stirred and irradiated using 34 W blue LED lamps for 4 hours. The reaction mixture was removed from the light, cooled to ambient temperature, quenched with 0.4 mL of sat. aq. $NH_4Cl$, and extracted with 1.1 mL of EtOAc. Mesitylene (internal standard, 2.5 μL) was added, and reaction mixture analyzed by GC for yield of 4. The reaction mixture was concentrated and nitromethane (internal standard, 2 μL, 0.0374 mmol) was added and analyzed by $^1H$ NMR for yield of 5.

Results and Discussion

Oxalate protected β-O-4 linkage model 3 was prepared in a high yield via consecutive acylation and oxalation (FIG. 17). Subjecting 3 to a photoredox condition led to formation of 4 and 5. Nonpolar solvents were mixed with DMSO, in order to solubilize all components. Ether solvents, such as CPME (CPME=cyclopentylmethylether), THP (THP=tetrahydropyran), and 1,4-dioxane, perform better than DMF and DMA (Table 4). Bases played a critical role in improving the yields. Among cesium salts, CsF gave higher yields than the others (entries 14-22). Examining other bases led to the identification of $Na_2HPO_4$ as the most effective base, to afford 4 in 78% yield and 5 in 79% yield (entries 11-12). Thus, the optimized conditions use $Ir[dF(CF_3)ppy]_2(dtbpy))PF_6$ as the photocatalyst, $Na_2HPO_4$ as the base, and a mixture of CPME and DMSO as the solvent under blue light irradiation (entry 11).

TABLE 5

Screening base and solvent in the photoredox degradation of model compound 3.

| Entry | Base | Solvent | Time (h) | 4 (% yield) | 5 E/Z (total % yield) |
|---|---|---|---|---|---|
| 1[b] | CsF | DMF | 4 | 10 | <1/<1 (<1) |
| 2[b] | CsF | DMA | 4 | 11 | 2/11 (13) |
| 3[b] | CsF | CPME | 1 | 23 | 14/23 (37) |
| 4[b] | CsF | CPME | 2 | 35 | 14/41 (55) |
| 5[b] | CsF | CPME | 4 | 43 | 11/45 (56) |
| 6[b] | CsF | CPME | 5 | 28 | 7/27 (34) |
| 7[b] | CsF | CPME | 16 | 30 | 9/27 (36) |
| 8[b] | CsF | CPME | 4 | 40 | 16/43 (59) |
| 9[a,b] | CsF | CPME | 4 | 40 | 14/48 (62) |
| 10[b] | CsF | CPME | 4 | 47 | 23/48 (71) |
| 11[b] | $Na_2HPO_4$ | CPME | 4 | 53 | 25/68 (93) |
| 12[i] | $Na_2HPO_4$ | CPME | 4 | 78 | 37/42 (79) |
| 13[b] | $Na_2CO_3$ | CPME | 4 | 45 | 18/68 (86) |
| 14[b] | $K_2HPO_4$ | CPME | 4 | 32 | 11/50 (61) |
| 15[f] | $K_3PO_4$ | CPME | 4 | 26 | 8/17 (25) |
| 16[f] | KOH | CPME | 4 | 32 | 7/16 (23) |
| 17[f] | $NaHCO_3$ | CPME | 4 | 38 | 15/24 (39) |
| 18[f] | NaI | CPME | 4 | 13 | <1/<1 (<1) |
| 19[f] | $NH_4PF_6$ | CPME | 4 | 12 | <1/2 (<3) |
| 20[g] | $Na_3PO_4$ | CPME | 4 | 55 | 26/39 (65) |

TABLE 5-continued

Screening base and solvent in the photoredox degradation of model compound 3.

| Entry | Base | Solvent | Time (h) | 4 (% yield) | 5 E/Z (total % yield) |
|---|---|---|---|---|---|
| 21[h] | $Na_3PO_4$ | CPME | 4 | 63 | 30/51 (81) |
| 22[b] | $Cs_2CO_3$ | THP | 4 | 15 | 7/23 (30) |
| 23[b] | CsF | THP | 4 | 26 | 11/43 (54) |
| 24[b] | KF | THP | 4 | 23 | 9/25 (34) |
| 25 | $K_2HPO_4$ | THP | 4 | 19 | 11/29 (40) |
| 26[d] | $Cs_2CO_3$ | 1,4-Dioxane | 4 | 30 | 5/23 (28) |
| 27[e] | $CsHCO_3$ | 1,4-Dioxane | 4 | 34 | 9/34 (43) |
| 28[e] | CsOAc | 1,4-Dioxane | 4 | 9 | <1/7 (7) |
| 29[e] | CsF | 1,4-Dioxane | 4 | 42 | 14/43 (57) |
| 30[e] | CsF | 1,4-Dioxane | 4 | 42 | 11/34 (45) |
| 31[b,c,f] | $Na_2HPO_4$ | CPME | 4 | 21 | 7/10 (17) |

[a]No 4A MS.
[b]At 100° C.
[c]At 40° C.
[d]Quenched with 3.23M HCl.
[e]Quenched with 1M HCl.
[f]Quenched with 2M HCl.
[g]3 equiv. of base.
[h]4 eq. of base
[i]Two Kessil lamps.

Figure 18:
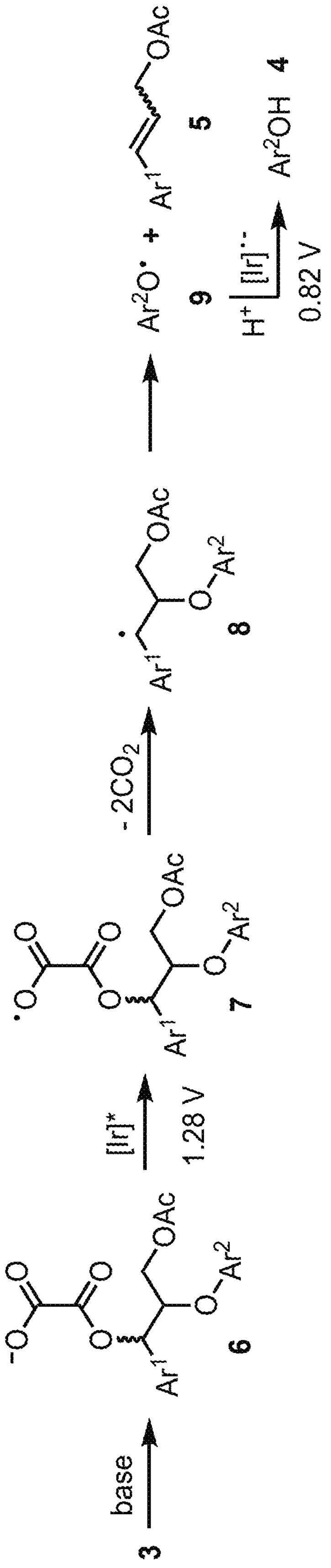
FIG. 18 depicts a possible reaction mechanism for the photoredox-triggered lignin depolymerization process.

The mechanism for the radical generation has been proposed previously (FIG. 18). Upon deprotonation by a base, oxalate 6 is oxidized by the excited photocatalyst to afford 7. Two consecutive decarboxylation steps give 8, which can undergo subsequent β-elimination. This elimination step is stereospecific, giving an E:Z ratio of 5 consistent with the diastereomeric ratio of 3.

Figure 19:
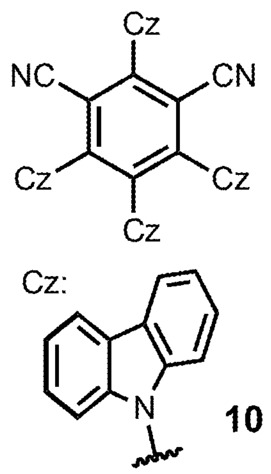
FIG. 19 depicts exemplary organic photoredox catalysts and reaction conditions.
Figure 19:
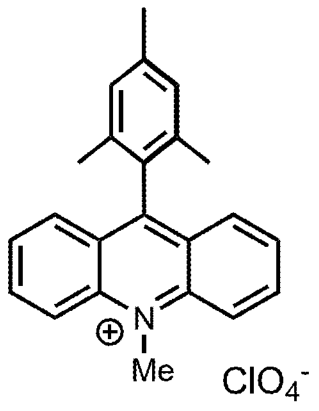

The oxidation potential of alkyl oxalates is 1.28 V (SCE). Any photocatalyst with an oxidation potential higher than 1.28 V may be used to execute this reaction (Arias-Rotondo, et al., Chem. Soc. Rev. 2016, 45, 5803-5820; Romero and Nicewicz, Chem. Rev. 2016, 116, 10075-10166; Glaser and Wenger, Coord. Chem. Rev. 2020, 405, 213129; Förster and Heinze, Chem. Soc. Rev. 2020, 49, 1057-1070). Examples include 4CzIPN 10 and acridine derivatives 11 (FIG. 19). Quantum dots can serve as cheap, easily recyclable photocatalysts as well (Harris, et al., Chem. Rev. 2016, 116, 12865-12919). A variety of bases, including metal carbonates, phosphates, fluorides, acetates, pivalates, as well as organic Bronsted bases can serve to promote the reaction. Proper crown ethers can be combined with the corresponding cation of the base to promote dissociation from oxalate. Various solvents alone or in combination with others are effective. $CO_2$ scavengers, including molecular sieves (Siriwardane, et al., Energy & Fuels 2001, 15, 279-284), MOF, COF (Ma, et al., J. Am. Chem. Soc. 2019, 141, 3843-3848), and zeolites can facilitate decarboxylation and accelerate the reaction.

Conditions optimized for the model substrate can be directly applied to the lignin sample. Treating lignin sample with a sequence of protection, activation, and degradation, lignin should depolymerize to afford phenol and cinnamyl acetate derivatives in high yields.

Example 5: Ti-Catalyzed Degradation of Lignosulfonate Model Compound

Lignosulfonates are a waste material produced from the pulp and paper industry. Due to the large scale of production, lignosulfonates represent the largest commercially available form of lignin. Lignosulfonates are obtained through the sulfite process, which involves treating wood biomass with an acidic sulfite buffer to separate cellucoses from lignin (Aro, et. al., ChemSusChem 2017, 10, 1861-1877; Fatehi, et. Al., ACS Symposium series, 2011, 16, 409-441). The structure of lignosulfonates features ubiquitous sulfonate groups that increase the material's solubility in water (Aro, et. al., ChemSusChem 2017, 10, 1861-1877). Lignosulfonates as a macromolecule have industrial utilities as emulsifiers, dispersants, and sequestrants in water treatment. A long-term milestone for lignin biorefinery is to utilize lignin as a source of aromatic monomers. However, reported conditions to depolymerize lignosulfonates into valuable, low-molecular-weight products suffer from harsh conditions, low yields and poor product selectivity (Xu, et. al., Chem. Comm. 2012, 48, 7019-7021; Yao, et. al. J. Colloid Interface Sci. 2022, 605, 648-656; Chen, et. al., Chromatographia 2021, 84, 109-116; Wu, et. al., RSC Adv. 2016, 6, 88788; Li, et. al., Bioresour. Technol. 2018, 264, 382-386; Bjorsvik and Minisci, Org. Proc. Res. Dev. 1999, 3, 330-340; Al-Naji, et. al., Green Chem. 2021, 23, 9894). Therefore, there is great opportunity in the valorization of lignosulfonates.

The Ti catalytic conditions are effective in depolymerizing lignosulfonate 12, a representative structure of lignosulfonates (FIG. 15, bottom; Table 6). The combination of $Cp_2TiCl_2$ and indium gave 2 and 13 in 15% and 4.7% yields, respectively (Entry 1). Other reductants including Zn, Mg, and Mn result in lower yields (Entry 2-4). This reaction could potentially work with other titanium catalysts, silyl chlorides, and nucleophilic additives, along with other transition metal catalysts including $Cp_2ZrCl_2$. Conditions optimized for the model substrate can be directly applied to polymeric samples of lignosulfonates. This condition is conceivably applicable to polymeric lignosulfonates.

TABLE 6

Ti— catalyzed degradation of lignosulfonate model compound 12.[a]

| Entry | Reductant | 2 (% yield) | 13 (% yield) | % Conversion |
|---|---|---|---|---|
| 1 | In | 15 | 4.7 | 24 |
| 2 | Zn | 7.4 | <1 | 20 |
| 3 | Mg | <1 | <1 | 95 |
| 4 | Mn | 11 | 3.3 | n.d. |

[a]Conditions: Model compound 12 (0.05 mmol), $CP_2TiCl_2$ (20 mol %), reductant (4 equiv), TMSCl (4 equiv), Additive (2 equiv), THF (0.25 mL), 22° C.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

We claim:

1. A method of depolymerizing a biopolymer, the method comprising the step of contacting the biopolymer with a reaction system comprising at least one catalyst comprising a metallocene selected from the group consisting of a titanocene metal complex, a zirconocene metal complex, and a hafnocene metal complex;

at least one electron source consisting of a pure metal; and at least one solvent.

2. The method of claim 1, wherein the at least one catalyst comprises a titanocene metal complex.

3. The method of claim 1, wherein the amount of catalyst is between 0.05 wt % and 60 wt % with respect to the biopolymer.

4. The method of claim 1, wherein the solvent is selected from the group consisting of water, methanol, ethanol, isopropanol, tert-butanol, ethylene glycol, 1,4-dioxane, acetic acid, acetone, dichloromethane, N,N-dimethylformamide, ethyl acetate, acetonitrile, hexane, hexene, octane, pentane, heptane, cyclohexane, iso-octane, toluene, benzene, diethylether, tetrahydrofuran, and combinations thereof.

5. The method of claim 1, wherein the biopolymer comprises lignocellulose.

6. The method of claim 1, wherein the biopolymer comprises lignin.

7. The method of claim 1, wherein the biopolymer comprises lignosulfonate.

8. The method of claim 1, wherein the biopolymer is in a biomass and wherein the method further comprises the step of extracting the biopolymer from the biomass.

9. The method of claim 1, wherein the electron source is selected from the group consisting of Zn metal, Mn metal, Fe metal, and In metal.

10. The method of claim 1, wherein the temperature of the reaction system is less than 50° C.

11. The method of claim 1, wherein the reaction system further comprises an oxide trap comprising a silyl chloride.

12. A method of depolymerizing a biopolymer, the method comprising the steps of:

providing a biopolymer;

adding an oxalyl group to the biopolymer to form a modified biopolymer; and irradiating the modified biopolymer comprising the oxalyl group with light in the presence of a reaction mixture; said mixture comprising a photoredox catalyst.

13. The method of claim 12, wherein the reaction mixture comprises a base.

14. The method of claim 12, wherein the photoredox catalyst is an Ir(III) complex, a Ru(II) complex, or an organic photoredox catalyst.

* * * * *